US007994683B2

(12) United States Patent
Cutsforth et al.

(10) Patent No.: US 7,994,683 B2
(45) Date of Patent: Aug. 9, 2011

(54) BRUSH HOLDER ASSEMBLY WITH SPRING CLIP

(75) Inventors: David L. Cutsforth, Cohasset, MN (US); Robert S. Cutsforth, Bellingham, WA (US)

(73) Assignee: Cutsforth Products, Inc., Cohasset, MN (US)

( * ) Notice: Subject to any disclaimer, the term of this patent is extended or adjusted under 35 U.S.C. 154(b) by 0 days.

(21) Appl. No.: 12/984,962

(22) Filed: Jan. 5, 2011

(65) Prior Publication Data

US 2011/0101820 A1 May 5, 2011

Related U.S. Application Data

(63) Continuation of application No. 12/048,776, filed on Mar. 14, 2008, now Pat. No. 7,880,362.

(51) Int. Cl.
*H02K 13/00* (2006.01)

(52) U.S. Cl. ......................... 310/239; 310/242; 310/246

(58) Field of Classification Search ........... 310/238–248
See application file for complete search history.

(56) References Cited

U.S. PATENT DOCUMENTS

| | | | | |
|---|---|---|---|---|
| 2,802,960 | A * | 8/1957 | Baker | 310/246 |
| 2,836,745 | A * | 5/1958 | Gillie | 310/246 |
| 2,840,732 | A | 6/1958 | Nottelmann | |
| 2,840,734 | A * | 6/1958 | Nottelmann et al. | 310/246 |
| 2,974,241 | A | 3/1961 | Harter | |
| 3,133,218 | A * | 5/1964 | Harris | 310/246 |
| 3,271,605 | A * | 9/1966 | Drabik | 310/239 |
| 3,387,155 | A | 6/1968 | Krulls | |
| 3,423,618 | A | 1/1969 | Parez | |
| 3,432,708 | A | 3/1969 | Bissett | |
| 3,454,803 | A | 7/1969 | Shaler | |
| 3,466,481 | A | 9/1969 | Sckerl | |
| 3,482,135 | A | 12/1969 | Hurlin | |
| 3,521,102 | A | 7/1970 | Kumar | |
| 3,525,891 | A | 8/1970 | Lukawich | |
| 3,526,797 | A * | 9/1970 | Jueschke | 310/245 |
| 3,634,710 | A | 1/1972 | Woda | |
| 3,710,160 | A | 1/1973 | Voglesonger | |
| 3,710,478 | A | 1/1973 | Krulls | |
| 3,842,302 | A | 10/1974 | Apostoleris | |
| 3,864,803 | A | 2/1975 | Ohmstedt et al. | |
| 3,902,088 | A | 8/1975 | Guglielmo | |
| 3,967,488 | A | 7/1976 | Hasselbeck | |
| 3,983,432 | A | 9/1976 | Rankin | |
| 4,041,339 | A | 8/1977 | Huber | |
| 4,082,975 | A | 4/1978 | Azarov et al. | |
| 4,085,346 | A | 4/1978 | Yoshida | |
| 4,110,651 | A | 8/1978 | Fagan | |
| 4,121,207 | A | 10/1978 | Jones | |
| 4,166,227 | A * | 8/1979 | Guglielmo | 310/242 |

(Continued)

*Primary Examiner* — Thanh Lam
(74) *Attorney, Agent, or Firm* — Seager, Tufte & Wickhem LLC

(57) ABSTRACT

A brush holder assembly of an electrical device is disclosed. The brush holder assembly includes a brush holder, a spring clip removable from the brush holder, a spring detachably coupled to the spring clip, and a spring retainer for retaining the spring on the spring clip. The spring clip is slidably disposed in channels of the brush holder. The detachable spring includes an end region extending around the end of the spring clip such that a first portion of the spring is facing a first side of the spring clip and a second portion of the spring is facing a second side of the spring clip. The spring retainer extends around the end of the spring clip over the end region of the spring.

16 Claims, 31 Drawing Sheets

U.S. PATENT DOCUMENTS 4,238,703 A 12/1980 Yoshida
4,272,695 A * 6/1981 Buchwald et al. ............ 310/242
4,296,346 A 10/1981 Ooki et al.
4,344,009 A 8/1982 Reynolds
4,355,254 A 10/1982 Oki et al.
4,366,404 A 12/1982 Ziegler
4,409,508 A 10/1983 Ooki et al.
4,420,705 A 12/1983 Kimberlin
4,488,078 A 12/1984 Orton
4,513,495 A 4/1985 Kimberlin
4,590,398 A 5/1986 Nagamatsu
4,743,787 A 5/1988 Bunner
5,043,619 A 8/1991 Kartman
5,256,925 A 10/1993 Cutsforth
5,373,210 A 12/1994 Baer et al.
5,631,513 A 5/1997 Coles et al.
5,731,650 A 3/1998 Scheucher
5,753,995 A 5/1998 Ogino
5,939,812 A 8/1999 Wetzel
6,326,716 B1 12/2001 Niimi
6,680,556 B2 1/2004 Menz
6,933,650 B2 8/2005 Wang
7,034,430 B2 4/2006 Custforth
7,053,516 B2 5/2006 Yu
7,153,359 B2 12/2006 Maekawa et al.
7,218,028 B2 5/2007 Annis et al.
7,365,470 B1 4/2008 Eger et al.
2003/0173856 A1 9/2003 Raye
2006/0119211 A1 6/2006 Annis et al.
2006/0145564 A1 7/2006 Li
2007/0035195 A1 2/2007 Custforth
2009/0230813 A1 9/2009 Cutsforth et al.

* cited by examiner

BRUSH HOLDER ASSEMBLY WITH SPRING CLIP

REFERENCE TO RELATED APPLICATIONS

This application is a continuation of U.S. patent application Ser. No. 12/048,776, filed Mar. 14, 2008, which is incorporated herein by reference.

TECHNICAL FIELD

The disclosure generally relates to brush holder assemblies that may be used in electrical devices and/or slip ring assemblies. More specifically, the disclosure relates to brush holder assemblies including a spring which is removable from a spring clip of a brush holder.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane, a wind turbine or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current.

In some designs, a box type brush holder is used to support the brush during operation. The brush and box are designed such that the brush can slide within the box to provide for continuing contact between the brush and the conductive surface contacted by the brush. Typically a spring, such as a constant force spring, presses against the upper surface of the brush to maintain contact between the lower surface of the brush and the conductive surface. Such springs are conventionally fixedly attached to a spring clip or a portion of the brush box such as with a rivet, weld or solder, thus not readily replaceable.

During the duration of operation of the electrical device, the brush will be reduced in size, or get shorter (i.e., diminish in longitudinal length), for example, as the wear surface of the brush in frictional sliding contact with the conductive surface wears down. Once a brush has worn beyond a threshold amount, the brush and/or other components may need to be replaced and/or maintenance may need to be performed.

A number of different brushes and brush holder structures, assemblies, and methods are known, each having certain advantages and disadvantages. However, there is an ongoing need to provide alternatives.

SUMMARY

The disclosure is directed to several alternative designs, materials and methods of manufacturing and use of brush holder device structures and assemblies in electrical applications.

Accordingly, one illustrative embodiment is a brush holder assembly including a brush holder configured for guiding a brush into contact with a moving surface, a spring clip removable from the brush holder, a spring detachably coupled to the spring clip, and a spring retainer for retaining the spring on the spring clip. The detachable spring includes an end region extending around an end of the spring clip such that a first portion of the spring is facing a first surface of the spring clip and a second portion of the spring is facing a second surface of the spring clip. The spring retainer extends around the end of the spring clip over the end region of the spring. The spring retainer includes a first portion extending over the first portion of the spring and a second portion extending over the second portion of the spring.

Another illustrative embodiment is a brush holder assembly of an electrical device. The brush holder assembly includes a brush holder configured for guiding a brush into contact with a moving surface, a spring clip, and a spring. The brush holder includes a first arcuate channel and a second arcuate channel. The spring clip is removably coupled to the brush holder. The spring clip includes a first edge slidably disposed in the first arcuate channel of the brush holder and a second edge slidably disposed in the second arcuate channel of the brush holder. The spring is coupled to the spring clip.

Yet another illustrative embodiment is a brush holder assembly of an electrical device. The brush holder assembly includes a brush holder mountable to a base member of the electrical device. The combination of a plurality of surfaces of the brush holder and a surface of the base member define an opening configured for the placement of a brush therein, wherein the opening has a first side defined by the surface of the base member and a plurality of additional sides defined by the plurality of surfaces of the brush holder.

The above summary of some example embodiments is not intended to describe each disclosed embodiment or every implementation of the invention.

BRIEF DESCRIPTION OF THE DRAWINGS

The invention may be more completely understood in consideration of the following detailed description of various embodiments in connection with the accompanying drawings, in which.

Figure 1:
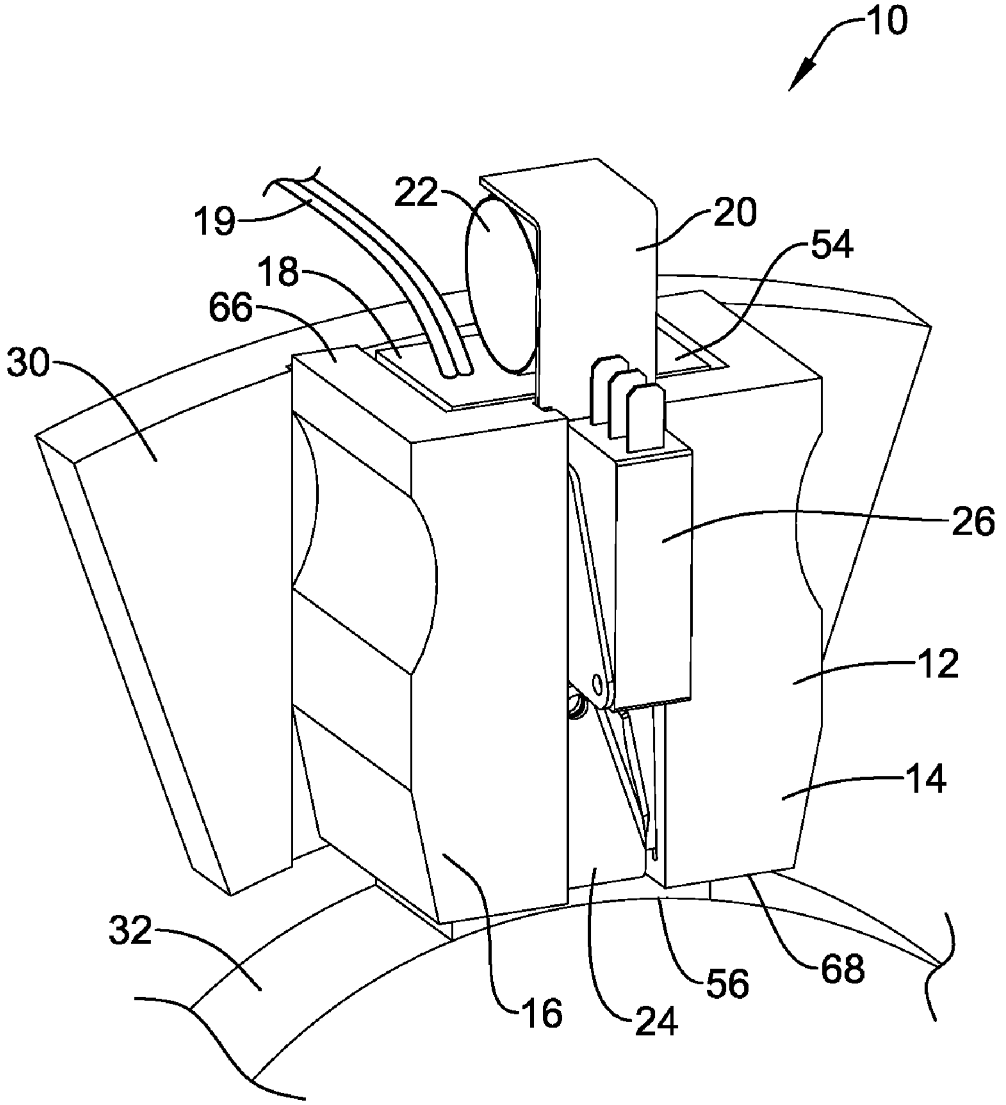
FIG. 1 is a perspective view of an exemplary brush holder assembly.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 2:
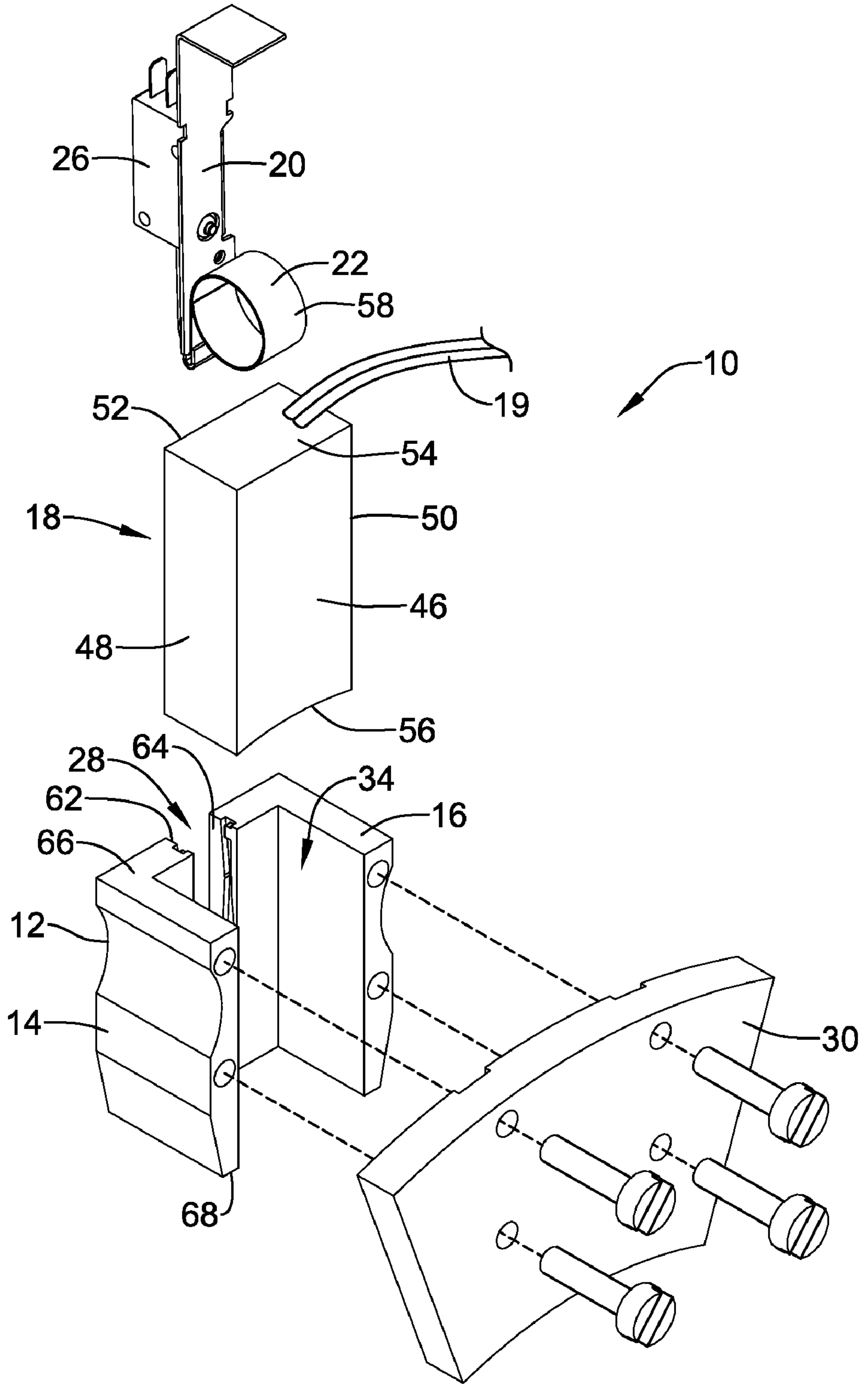
FIG. 2 is an exploded view of the brush holder assembly of FIG. 1.

Now referring to FIGS. 1 and 2, an illustrative brush holder assembly 10 is shown. The brush holder assembly 10 is shown assembled in FIG. 1, while FIG. 2 shows various components of the brush holder assembly 10 in an exploded view for illustrative purposes.

The brush holder assembly 10 may include a brush holder 12, such as a brush box, surrounding a brush 18 on several sides and including a plurality of guiding surfaces for guiding linear or longitudinal movement of the brush 18 therein into contact with a moving surface of an electrical device. However, in other embodiments, the brush holder assembly 10 may include a brush holder, such as one or more posts for guiding linear or longitudinal movement of a brush into contact with a moving surface of an electrical device.

One side of the brush holder 12 may include a slot 28 extending from the top of the brush holder 12 toward the bottom of the brush holder 12. For example, the slot 28, which may be an opening, may extend from the top surface 66 of the brush holder 12 to the bottom surface 68 of the brush holder 12, dividing the brush holder 12 into two portions, a first portion 14 and a second portion 16. The first portion 14 of the brush holder 12 may face the brush 18 on one or more, or a plurality of sides of the brush 18 and/or the second portion 16 of the brush holder 12 may face the brush 18 on one or more, or a plurality of additional sides of the brush 18. As shown in FIGS. 1 and 2, the first portion 14 is a separate component from the second portion 16, together forming the brush holder 12. However, in other embodiments, the first portion 14 and the second portion 16 may be two portions of a unitary structure forming the brush holder 12. In some embodiments, the slot 28 between the first portion 14 and the second portion 16 of the brush holder 12 may be a recess, depression, gap, space, opening or the like, of the brush holder 12.

The brush holder 12 may be secured to a stationary structure, such as a base member or yoke 30 of the electrical device, a portion thereof which is shown in FIGS. 1 and 2. In other embodiments, the stationary structure may be a stud, cross arm, adapter, or other member of the electrical device which remains stationary relative to the moving contact surface in sliding contact with the brush 18. For example, in some embodiments, the brush holder 12 may be rigidly mounted to another structure holding the brush holder 12 stationary, or mounted to another structure in any desired arrangement. For instance, in some embodiments the brush holder 12 may be bolted or welded to the stationary structure, such as bolted or welded to the base member or yoke 30. As shown in FIGS. 1 and 2, each of the first portion 14 and the second portion 16 of the brush holder 12 may be bolted to the base member or yoke 30 with a plurality of bolts or other fasteners. Additional brush holders, such as a second, third, fourth, fifth and/or sixth brush holder similar to the brush holder 12 disclosed herein, may be secured to the stationary structure, such as the base member or yoke 30 as desired. For example, first, second, third, fourth, fifth and/or sixth brush holders may be secured to the base member or yoke 30 radially around the moving contact surface of the electrical device.

The first portion 14 of the brush holder 12 may be spaced from the second portion 16 of the brush holder 12 along one side of the brush holder 12 such that the slot 28, which may be an opening between the first portion 14 and the second portion 16, is defined between an edge 62 of the first portion 14 and an opposing edge 64 of the second portion 16. In some embodiments, the edge 62 of the first portion 14 may be parallel with the edge 64 of the second portion 16.

Secured to the stationary structure, for example the base member or yoke 30, the brush holder 12 defines an interior opening 34 for receiving a brush 18 therein. As shown in the figures, the interior opening 34 may be defined by a surface 36 of the stationary structure (e.g., the base member or yoke 30), first and second interior surfaces 38, 40 of the first portion 14 of the brush holder 12, and first and second interior surfaces 42, 44 of the second portion 16 of the brush holder 12. In other words, the surface 36 of the stationary structure may face a first side surface 46 of the brush 18, the first interior surface 38 of the first portion 14 may face a second side surface 48 of the brush 18, the first interior surface 42 of the second portion 14 may face a third side surface 50 of the brush 18, and the second interior surfaces 40, 44 of the first and second portions 14, 16 of the brush holder 12 may face a fourth side surface 52 of the brush 18. It is to be noted, however, that in other embodiments a surface of a portion of the brush holder 12 placed adjacent the surface 36 of the stationary structure may partially define the interior opening 34 in place of or in addition to the surface 36 of the stationary structure.

The brush holder assembly 10 is configured to place the bottom surface 56 of the brush 18 in contact with a conductive surface 32, such as a rotating surface of a collector ring, a slip ring, or a commutator, and conduct current therefrom. The brush 18 may be positioned in the interior opening 34 of the brush holder 12 and may extend from the lower edge of the brush holder 12 such that a wear surface of the brush 18 engages the conductive surface 32. The brush 18 may include one or more, or a plurality of shunts 19 secured to the brush 18 providing a conductive pathway to or from the brush 18 for the flow of electricity.

The brush holder assembly 10 may also include a brush wear indicator switch 26 configured to indicate when the brush 18 has worn beyond a threshold amount through frictional and electrical contact with the conductive surface 32. The switch 26 may generate a signal which indicates to an operator, monitor or other personnel that a brush 18 and/or other components may need to be replaced and/or maintenance may need to be performed on the brush holder assembly 10. The switch 26 may include one or more, or a plurality of electrical terminals providing an electrical pathway for carrying an electrical current to and/or from the switch 26, to generate an electrical signal.

Also illustrated in FIGS. 1 and 2 is a brush spring 22, such as a constant force spring, which provides tension to the brush 18 to bias the brush 18 toward and in contact with the conductive surface 32. For instance, the coiled portion 58 of the spring 22 may be in contact with the top surface 54 of the brush 18 and press against the top surface 54 of the brush 18, while a longitudinally extending portion (e.g., elongated portion) of the spring 22 may extend along and/or contact the fourth side surface 52 of the brush 18.

The spring 22 may be coupled to a spring clip 20, which may be removable from the brush holder 12 of the brush holder assembly 10. The spring 22 may be removably coupled to the spring clip 20 as further described herein, such that the spring 22 may be readily removed from the spring clip 20 and replaced with a new spring 22 as desired. For instance, it may be desirable to replace the spring 22 with a new spring 22 each time a new brush 18 is installed in the brush holder assembly 10.

In some embodiments, the spring 22 and the spring clip 20 may be configured such that replacement of the spring 22 may be performed without the need for additional tools and/or extensive time requirements. In some embodiments, a detachable connection is formed directly between the spring 22 and the spring clip 20, wherein structure of the spring clip 20 interconnects (e.g., interlocks, latches) with structure of the spring 22 to provide the detachable connection between the spring 22 and the spring clip 20. In some embodiments, the spring clip 20 includes a spring retaining structure cooperating with the end region 116 of the spring 22 to detachably couple the spring 22 to the spring clip 20. For instance, in some embodiments the spring retaining structure of the spring clip 20 may include geometry interconnecting (e.g., interlocking, latching) with mating geometry of the end region 116 of the spring 22 to provide a detachable connection directly between the spring 22 and the spring clip 20. In some embodiments, movement between the spring 22 and the spring clip 20 may be limited in one or more axes. In some embodiments a removable pin or clip and/or a magnet may be used to maintain the connection between the spring 22 and the spring clip 20 and/or ensure the connection between the spring 22 and the spring clip 20 is maintained.

In some embodiments, the spring 22 may be removably coupled to the spring clip 20 without the use of a rivet, weld, solder or other similar fastening means. In some embodiments the spring 22 may be removed from the spring clip 20 without removing a bolt, screw of other threaded fastener. Thus, in some embodiments, the spring 22 may be slipped or slid on and off, or otherwise disconnected from the spring clip 20 without the need of removing a bolt, screw, rivet, weld, solder, or other fastening means.

Additionally, a spring retainer 24 may be present to further hold or retain the spring 22 in connection with the spring clip 20. The spring retainer 24 may be actuated between a first position which retains the spring 22 on the spring clip 20 and a second position in which the spring 22 may be readily removed from the spring clip 20. Further discussion of the interaction between the spring clip 20, the spring 22 and the spring retainer 24 will be described while referring to FIGS. 10 through 13. It is noted that other spring retaining structures, including other spring retaining structures disclosed herein may also be used to detachably couple the spring 22 to the spring clip 20.

The spring clip 20 may be located between the first portion 14 and the second portion 16 of the brush holder 12 such that the spring clip 20 spans the slot 28 between the edge 62 of the first portion 14 and the edge 64 of the second portion 16. For example, as described later herein, opposing longitudinal edge portions of the spring clip 20 may be slidably disposed in opposing channels or grooves defined in the first and second portions 14, 16 of the brush holder 12. With the spring clip 20 in place, the longitudinally extended portion 60 (e.g., the elongated portion) of the spring 22 may be located between the spring clip 20 and the brush 18, facing the fourth side surface 52 of the brush 18.

In some embodiments, the spring clip 20 may be flexible, while the brush holder 12 may be rigid. For example, the spring clip 20 may be formed of a resilient material providing the spring clip 20 with flexibility, while the brush holder 12 may be formed of a material making the brush holder 12 more rigid than the spring clip 20. Additionally or alternatively, in some embodiments the spring clip 20 may have a thickness less than the wall thickness of the brush holder 12.

Figure 3:
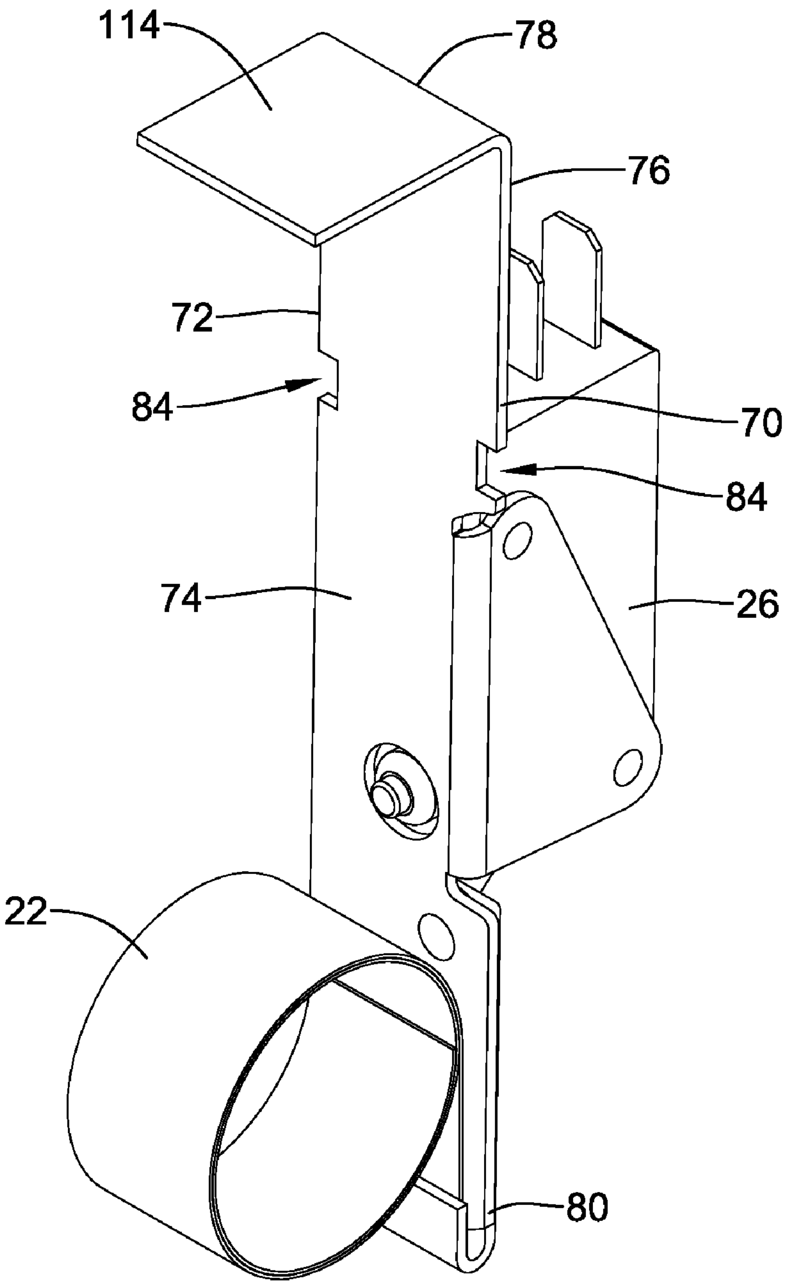
FIG. 3 is a perspective view of the spring clip of the brush holder assembly of FIG. 1.

Interaction between the spring clip 20 and the brush holder 12 will now be further discussed while referring to FIGS. 3 through 6D. As shown in FIG. 3, the spring clip 20 includes a first longitudinal edge 70 extending from a first end 78 of the spring clip 20 to a second end 80 of the spring clip 20, and a second longitudinal edge 72, opposite the first edge 70, extending from the first end 78 of the spring clip 20 to the second end 80 of the spring clip 20. The spring clip 20 also includes a first surface 74 on a first side of the spring clip 20 extending between the first edge 70 and the second edge 72, and a second surface 76 on a second side of the spring clip 20, opposite the first surface 74, extending between the first edge 70 and the second edge 72. In some embodiments, the first surface 74 may be parallel to the second surface 76 and/or the first edge 70 may be parallel to the second edge 72. Furthermore, in some embodiments the first and second edges 70, 72 may be orthogonal to the first and second surfaces 74, 76.

The spring clip 20 may include a first notch 84 and/or a second notch 84 along one or both of the edges 70, 72 of the spring clip 20. The spring clip 20 may also include a handle portion 114 located at the second end 80 of the spring clip 20. For instance, the handle portion 114 may be a portion of the spring clip 20 bent at an angle relative to another portion of the spring clip 20. In other embodiments the handle portion 114 may be a separate component of the spring clip 20 attached to the main body of the spring clip 20. In some embodiments, the handle portion 114 may include a covering, such as a polymeric sleeve or foam covering (not shown) encasing or surrounding the handle portion 114 of the spring clip 20.

The spring clip 20 may be formed of a resilient material giving the spring clip 20 a degree of springiness (i.e., elastic flexibility) such that the spring clip 20 can undergo elastic deformation or deflection with an applied force to a non-equilibrium position, yet return to its equilibrium position when the applied force is removed. For example, the spring clip 20 may be formed of aluminum, beryllium, brass, chromium, copper, gold, iron, nickel, palladium, platinum, silver, tin, tungsten, or alloys thereof, or the like. In some embodiments, the spring clip 20 may be copper or a copper alloy, for example, a beryllium copper material.

Figure 4:
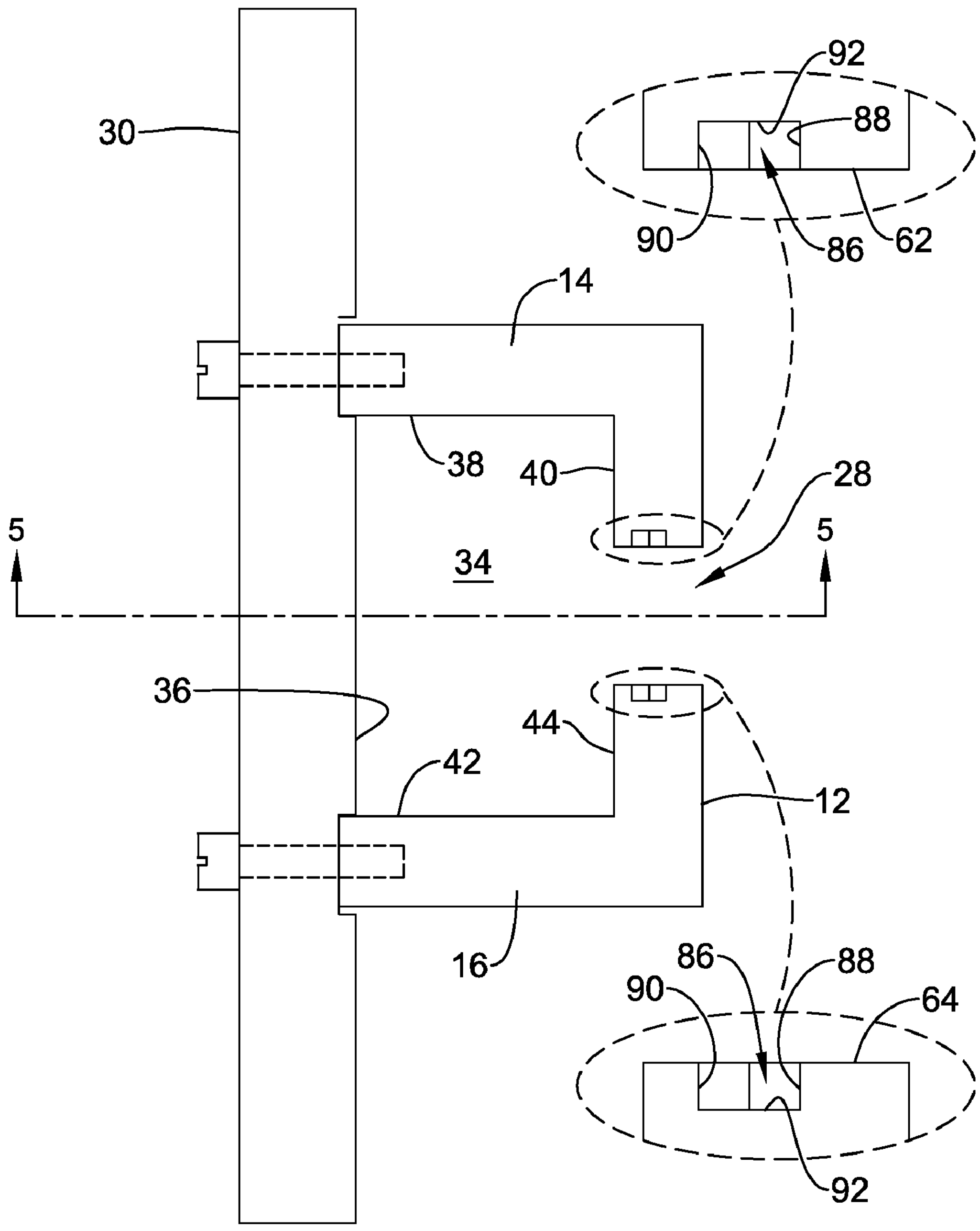
FIG. 4 is a top view of the brush holder of the brush holder assembly of FIG. 1.

FIG. 4 is a top view of the brush holder 12 attached to the stationary structure shown as a base member or yoke 30 with bolts shown in phantom lines, illustrating the interior opening 34 of the brush holder 12 at least partially defined by the first portion 14 and the second portion 16 of the brush holder 12 secured to the stationary structure shown as the base member or yoke 30. As discussed above, the interior opening 34, which may be a square or rectangular opening, may be defined by the surface 36 of the stationary structure (e.g., the base member or yoke 30), first and second interior surfaces 38, 40 of the first portion 14 of the brush holder 12, and first and second interior surfaces 42, 44 of the second portion 16 of the brush holder 12. The first interior surface 38 of the first portion 14 may be perpendicular to the second interior surface 40 of the first portion 14, and the first interior surface 42 of the second portion 16 may be perpendicular to the second interior surface 44 of the second portion 16. Furthermore, the second interior surface 40 of the first portion 14 may be parallel to and lie in the same plane as the second interior surface 44 of the second portion 16.

Furthermore, it is further illustrated in FIG. 4 that the edge 62 of the first portion 14 is spaced from the edge 64 of the second portion 16 of the brush holder 12, defining the slot 28 between the edge 62 of the first portion 14 and the edge 64 of the second portion 16 of the brush holder 12. The edges 62, 64 of the brush holder 12 each include a channel 86 extending along the edges 62, 64 of the brush holder 12. The channels 86 each include a first side surface 88, a second side surface 90 and a bottom surface 92. In some embodiments, the first and second side surfaces 88, 90 may be perpendicular to the edges 62, 64 of the brush holder 12, and/or the bottom surface 92 may be parallel to the edges 62, 64 of the brush holder 12.

Figure 5:
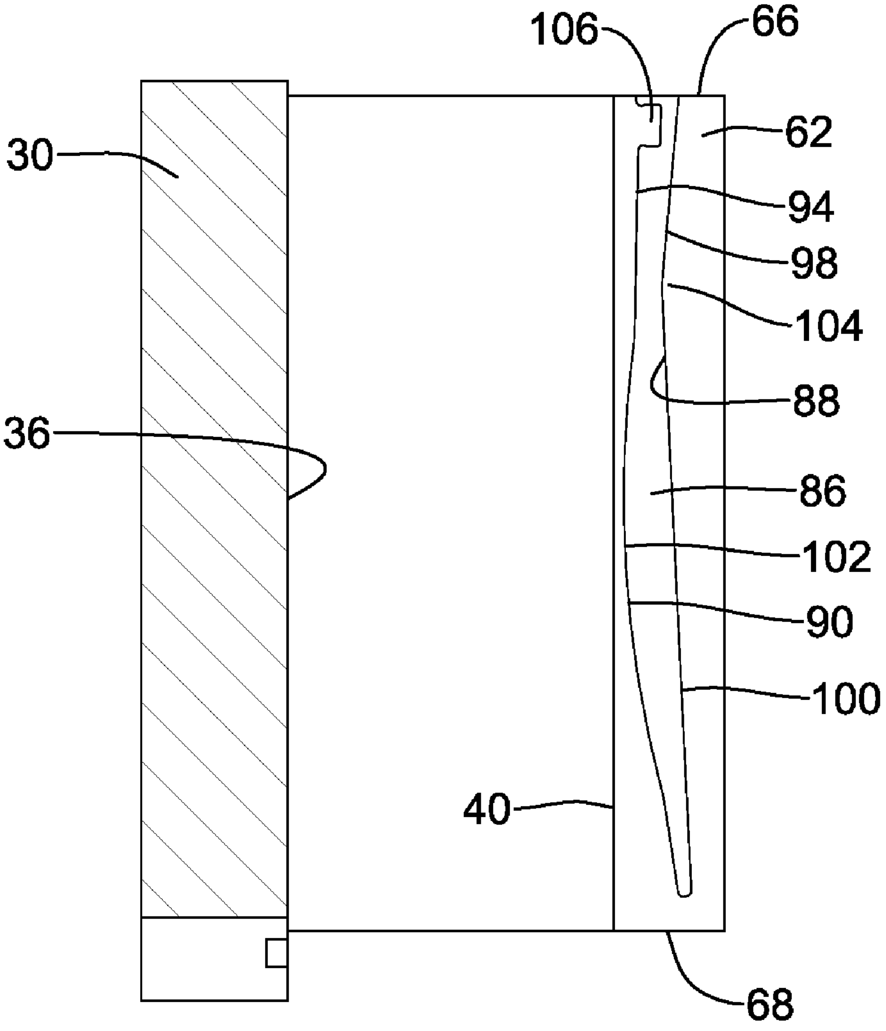
FIG. 5 is a cross-sectional view of the brush holder of the brush holder assembly of FIG. 1 taken along line 5-5 of FIG. 4.

FIG. 5 is a cut away cross-sectional view of the brush holder 12 taken along line 5-5 of FIG. 4 further illustrating the channel 86 in the edge 62 of the first portion 14 of the brush holder 12. It is noted that although not shown, the channel 86 in the edge 64 of the second portion 14 may be a mirror image of the channel 86 in the edge 62 of the first portion 14. Thus, discussion of only one channel 86 will be described, noting that the opposing channel 86 in the edge 64 of the second portion 16 of the brush holder 12 would be substantially similar, albeit a mirror image of the channel 86 in the edge 62 of the first portion 14 of the brush holder 12.

The channel 86 may be a nonlinear channel extending from the top surface 66 of the brush holder 12 toward the bottom surface 68 of the brush holder 12. Thus, in some embodiments the channel 86 may be open to the top surface 66 of the brush holder 12, but not open to the bottom surface 68 of the brush holder 12. As shown in FIG. 5, the first side surface 88 of the channel 86 may include a first planar portion 98 proximate the top surface 66 of the brush holder 12 and a second planar portion 100 at an angle to the first planar portion 98, converging at a point 104. The second side surface 90 of the channel 86 may include an arcuate portion 102, a planar portion 94, and a protrusion 106 extending from the planar portion 94 of the second side surface 90 toward the first side surface 88 proximate the top surface 66 of the brush holder 12. In some embodiments, the protrusion 106 and the point 104 may line in an invisible plane which is parallel to the second interior surface 40 of the first portion 14 of the brush holder 12 (and thus parallel to the second interior surface 44 of the second portion 16 of the brush holder 12).

The first planar portion 98 of the first side surface 88 of the channel 86 may not be parallel to the second interior surface 40 of the first portion 14 of the brush holder 12 and/or the second planar portion 100 of the first side surface 88 of the channel 86 may not be parallel to the second interior surface 40 of the first portion 14 of the brush holder 12. In some embodiments the planar portion 94 of the second side surface 90 of the channel 86 may be parallel to the second interior surface 40 of the first portion 14 of the brush holder 12 (and thus parallel to the second interior surface 44 of the second portion 16 of the brush holder 12).

Figure 6A:
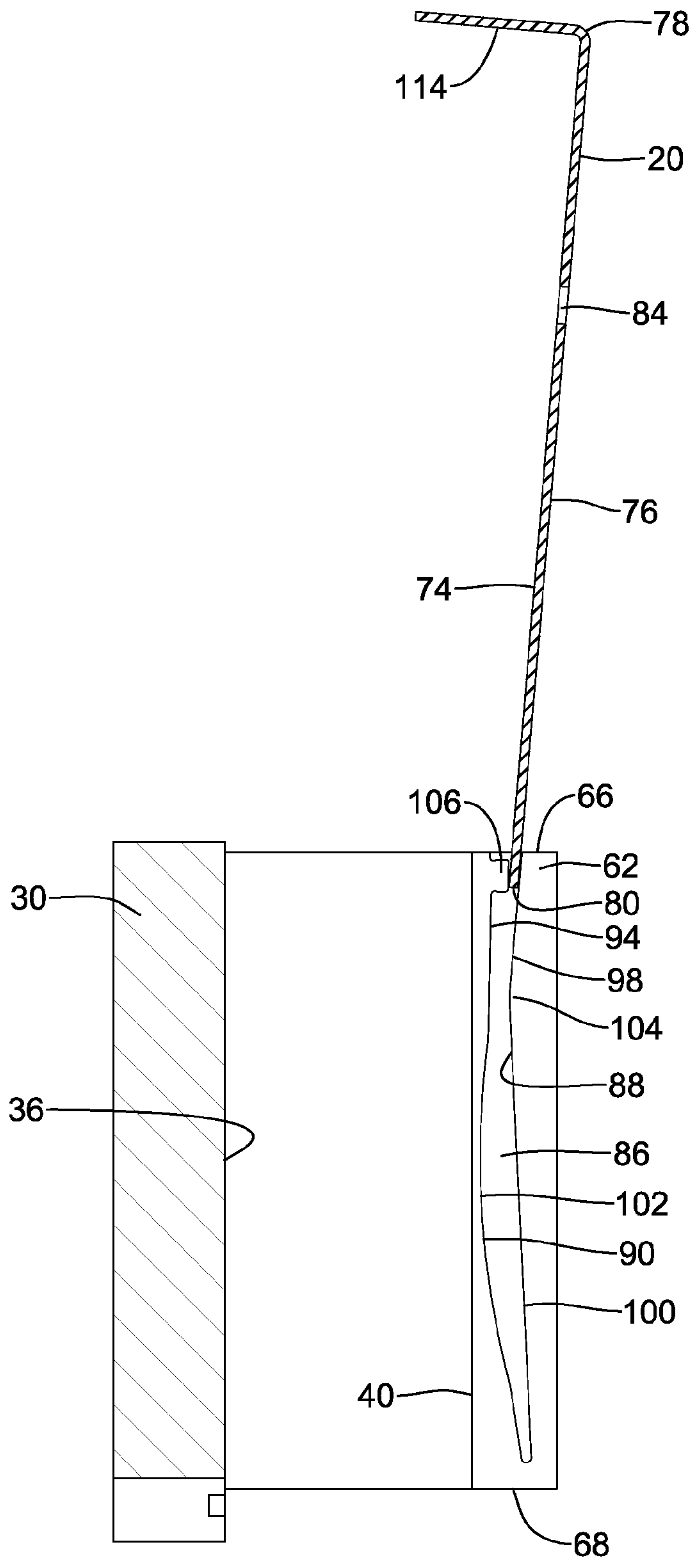
FIGS. 6A through 6D illustrate the interaction of the spring clip with the channels of the brush holder during advancement of the spring clip in the channels of the brush holder.

Now referring to FIGS. 6A through 6D, the interaction of the spring clip 20 in the channels 86 of the brush holder 12 will be further discussed. The spring clip 20 may be slidably disposed in the channels 86 of the first and second edges 62, 64 of the brush holder 12 such that the first and second longitudinal edges 70, 72 of the spring clip 20 are disposed in the channels 86. FIG. 6A illustrates the spring clip 20 first introduced into the channel 86 from the top surface 66 of the brush holder 12. As the spring clip 20 is first introduced into the channel 86, the first planar portion 98 of the first side surface 88 of the channel 86 may guide the spring clip 20 into the channel 86 such that the second surface 76 of the spring clip 20 is parallel to and in sliding contact with the first planar portion 98 of the first side surface 88.

Figure 6B:
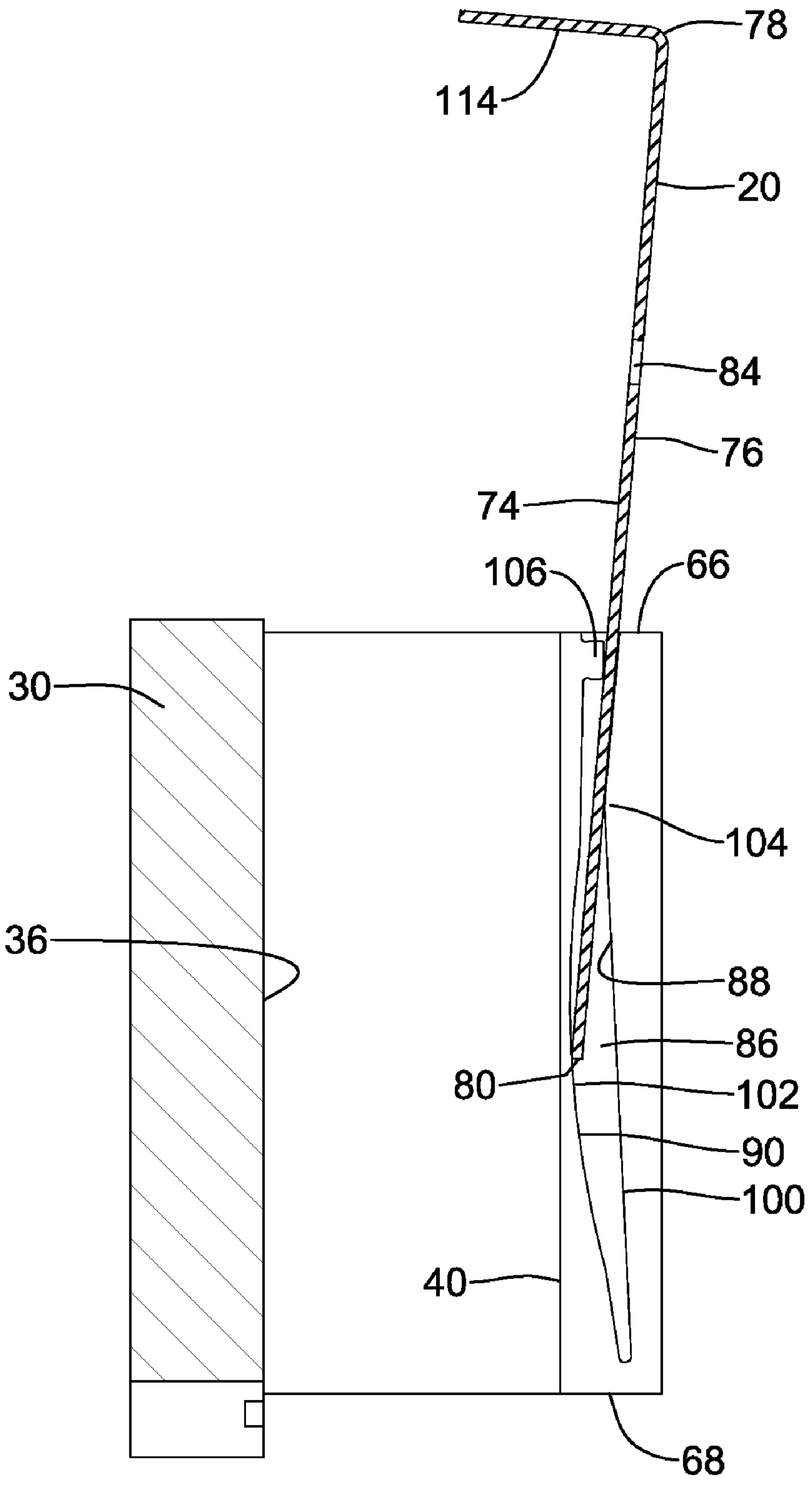

As shown in FIG. 6B, as the spring clip 20 is further advanced toward the bottom surface 68 of the brush holder 12, the second end 80 of the spring clip 20 travels toward the second side surface 90 until the second end 80 contacts the arcuate portion 102 of the second side surface 90 of the channel 86. Further advancement of the spring clip 20 toward the bottom surface 68 of the brush holder 12 causes the spring clip 20 to bend or deflect as the second end 80 of the spring clip 20, in contact with the arcuate portion 102, tracks the curvature of the arcuate portion 102.

Figure 6C:
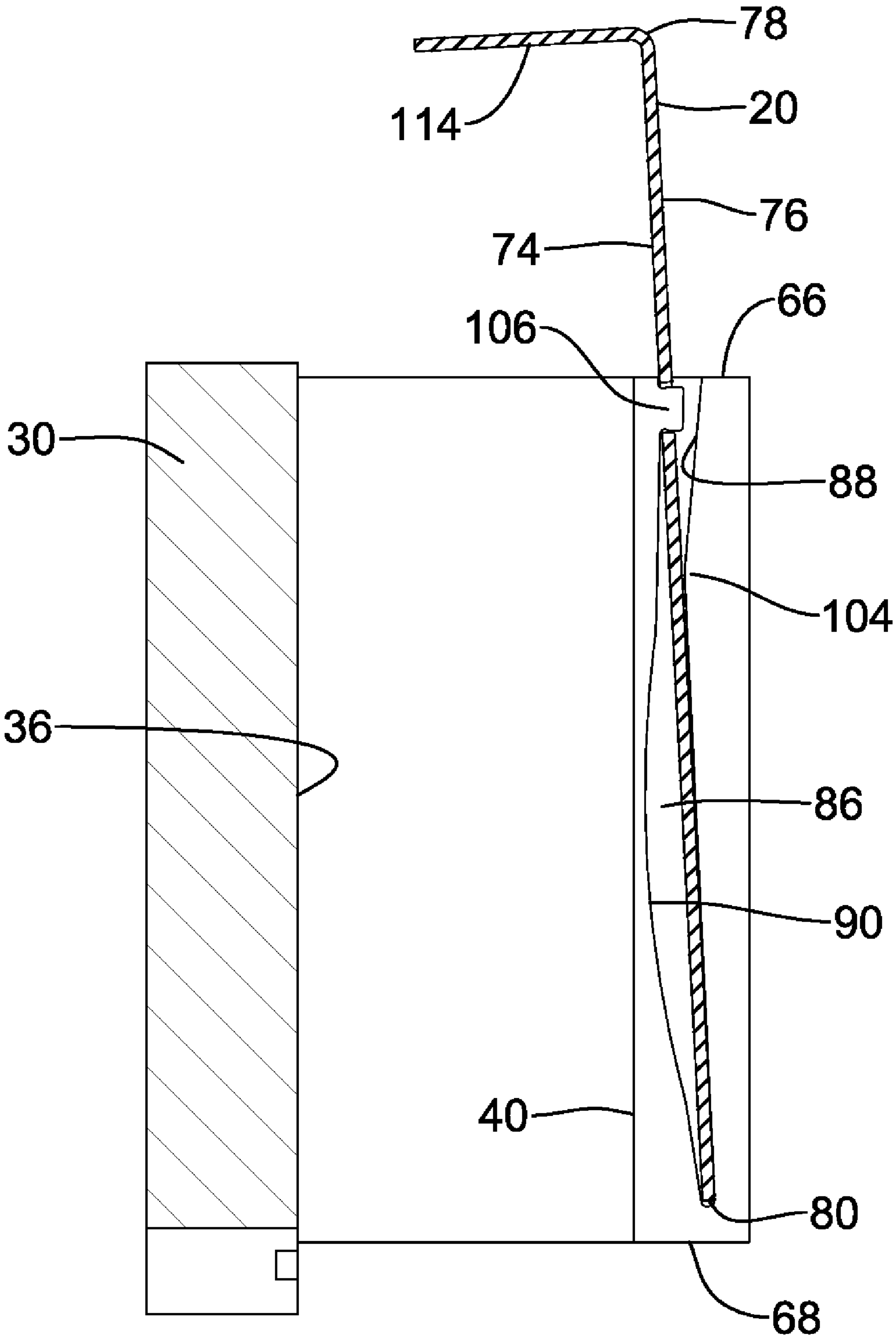

FIG. 6C illustrates the spring clip 20 fully advanced into the channel 86 such that the second end 80 of the spring clip 20 is proximate the lower end of the channel 86. With the spring clip 20 fully advanced into the channel 86, the spring clip 20 remains in flexion or bending such that the spring clip 20 has a curvature from forces applied to the spring clip 20 from contact with the first side surface 88 and/or the second side surface 90 of the channel 86. For example, the point 104 on the first side surface 88 of the channel 86 may act as a fulcrum around which the spring clip 20 is elastically bent, while a portion of the spring clip 20 proximate the second end 80 of the spring clip 20 is in contact with the second side surface 90 and a portion of the spring clip 20 proximate the first end 78 of the spring clip 20 is in contact with the second side surface 90. In this position, internal forces in the spring clip 20 attempt to straighten the spring clip 20, urging the first end 78 of the spring clip 20 toward the protrusion 106 extending from the second side surface 90. In this position with the spring clip 20 in flexion or bending, the protrusion 106 is located in the notch 84 of the edge 72 of the spring clip 20. With the protrusion 106 located in the notch 84, the spring clip 20 is locked in the channel 86, until an external force is applied to the spring clip 20. In this locked position, the first surface 74 of the spring clip 20 may be in contact with and/or parallel to the planar surface 94 of the second side surface 90 of the channel 86.

Figure 6D:
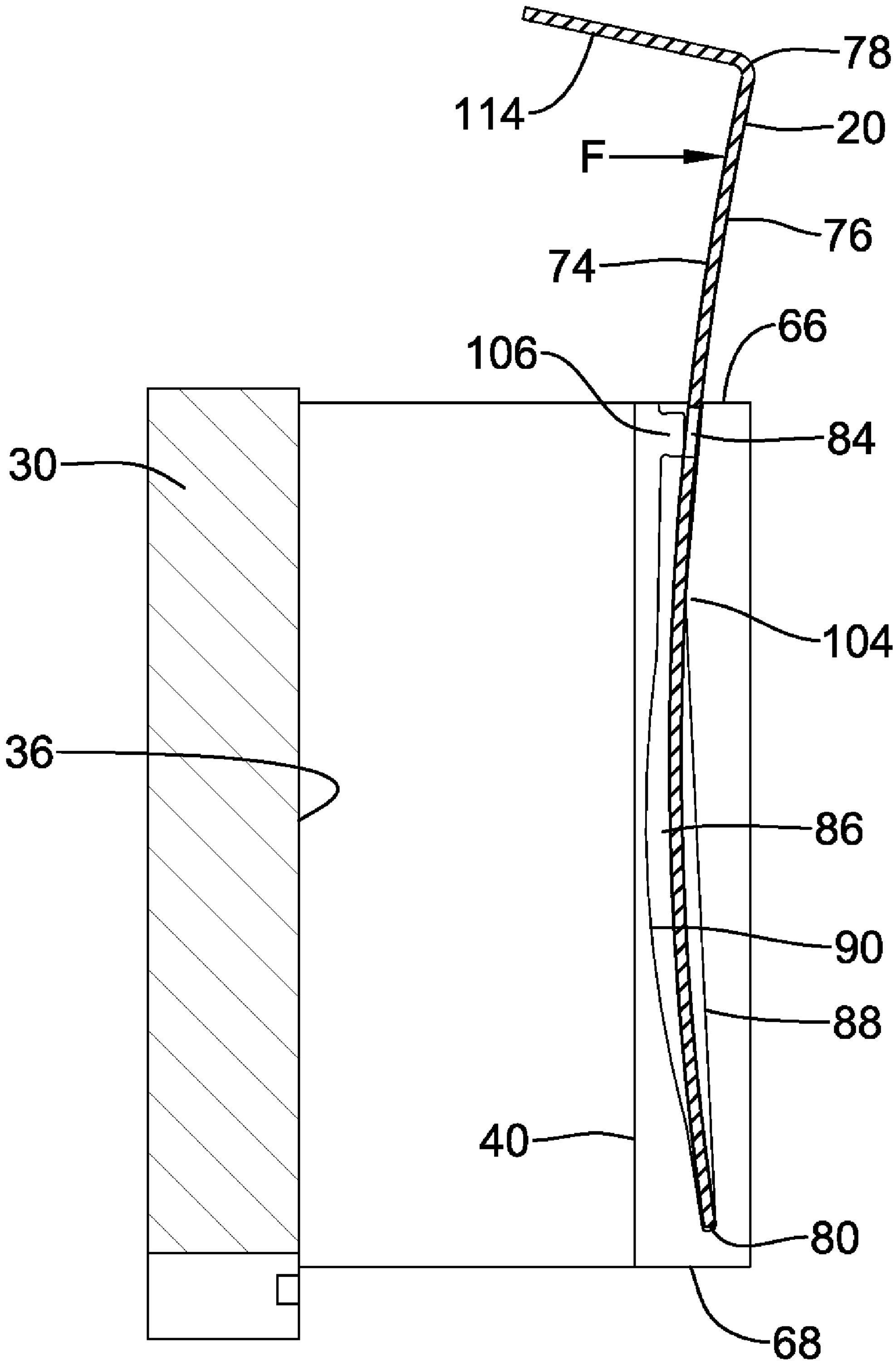

As shown in FIG. 6D, when it is desired to remove the spring clip 20 from the channel 86, an external force F may be applied to a portion of the spring clip 20 extending above the top surface 66 of the brush holder 12. The applied force F disengages the protrusion 106 from the notch 84, allowing the spring clip 20 to be slid out of or removed from the channel 86. Thus, it can be seen that the interaction of the resilient spring clip 20 with the configuration of the channel 86 allows the spring clip 20 to be locked into the channel 86 to prevent the spring clip 20 from inadvertently being removed from the channel 86, yet allows the spring clip 20 to be disengaged from the brush holder 12 when desired by simply applying an external force and thus deflecting the spring clip 20.

FIGS. 7, 7A, 8 and 8A illustrate the interaction between the spring 22 and the switch 26 in signaling brush wear during operation of an electrical device. In the illustrated embodiment, the switch 26 is mounted on the second surface 76 of the spring clip 20 external of the interior opening 34 of the brush holder 12. For example, the spring clip 20 may include a bracket 108 to which the switch 26 may be mounted to. In some embodiments, the bracket 108 may be formed of the same piece of material as the remainder of the spring clip 20, and bent or formed to angle from the remainder of the spring clip 20. In other embodiments, the bracket 108 may be a separate piece attached the spring clip 20. The bracket 108 may extend at an angle to the second surface 76 of the spring clip 20. For instance, the bracket 108 may extend at an oblique angle or at a perpendicular angle to the second surface 76 of the spring clip 20. In other embodiments, the switch 26 may be mounted to another component of the brush holder assembly 10, such as a portion of the brush holder 12.

The switch 26 may include a button 110 extending through an opening 112 of the spring clip 20. The opening 112 may extend from the first surface 74 of the spring clip 20 to the second surface 76 of the spring clip 20. The button 110 then may extend from the switch 26 on the second surface 76 of the spring clip 20, through the opening 112, to the first surface 74 of the spring clip 20.

Figure 7:
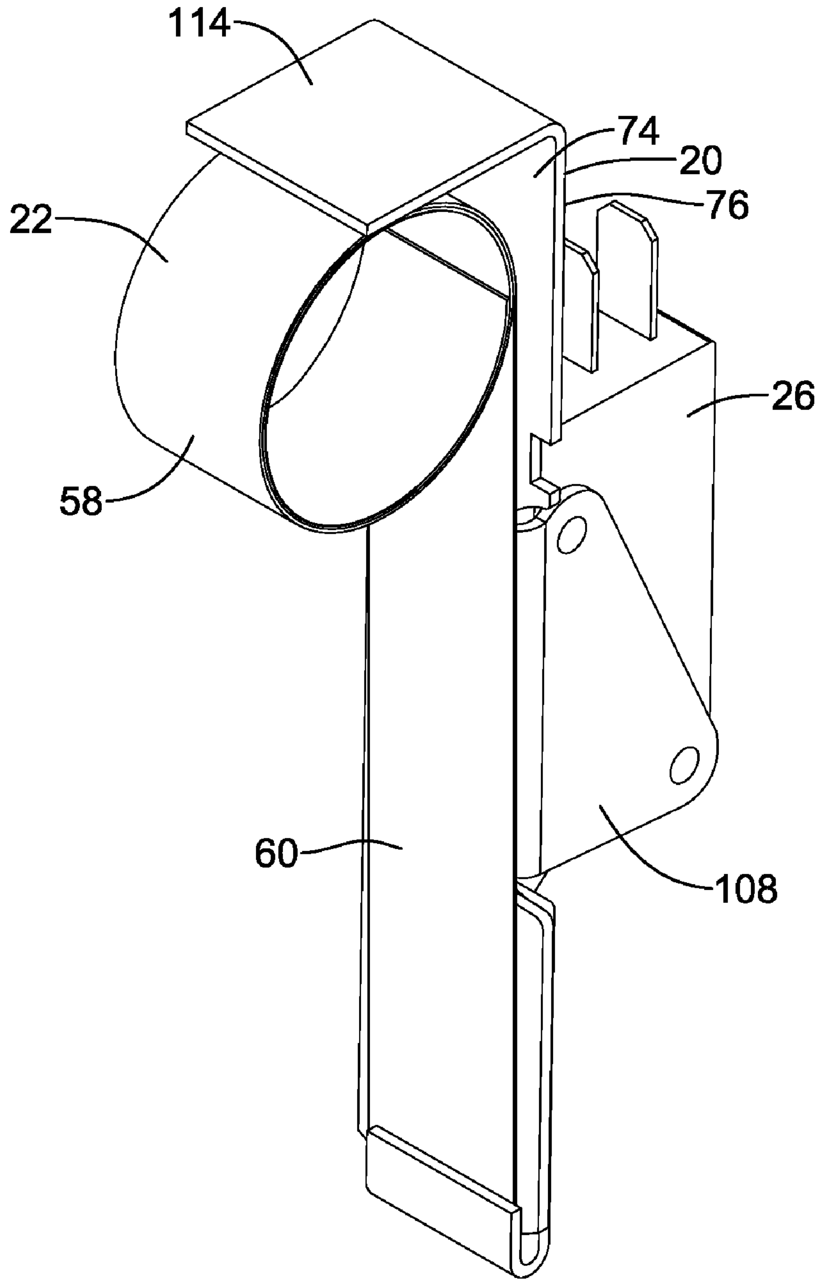
FIG. 7 is a perspective view of the spring clip and attached spring of the brush holder assembly of FIG. 1 with the spring in an unwound, upward position.
Figure 7A:
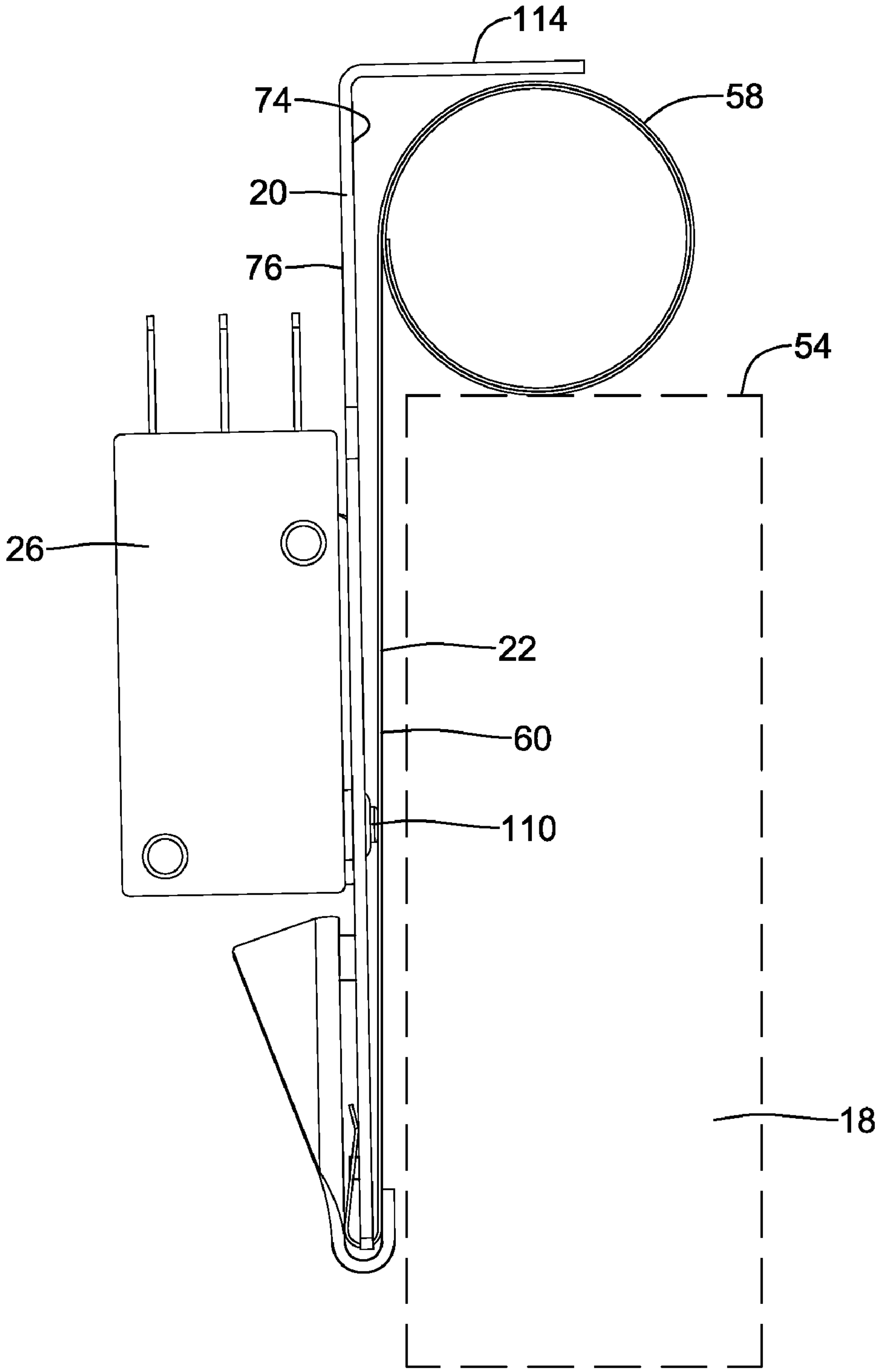
FIG. 7A is a side view of the spring clip and attached spring of FIG. 7.

FIG. 7A shows a brush 18 (in phantom lines) associated with the spring 22 and spring clip 20 of the brush holder assembly 10. When the brush 18 is installed in the brush holder assembly 10, the coiled portion 58 of the spring 22 is located on the top surface 54 of the brush 18, while the longitudinally extended portion 60 (e.g., elongated portion) of the spring 22 is located between the brush 18 and the spring clip 20. As shown in FIG. 7A, when the brush 18 is sufficiently long (i.e., longer than a threshold length), the longitudinally extended portion 60 of the spring 22 extends along a substantial portion of the spring clip 20 and depresses the button 110 of the switch 26.

Figure 8:
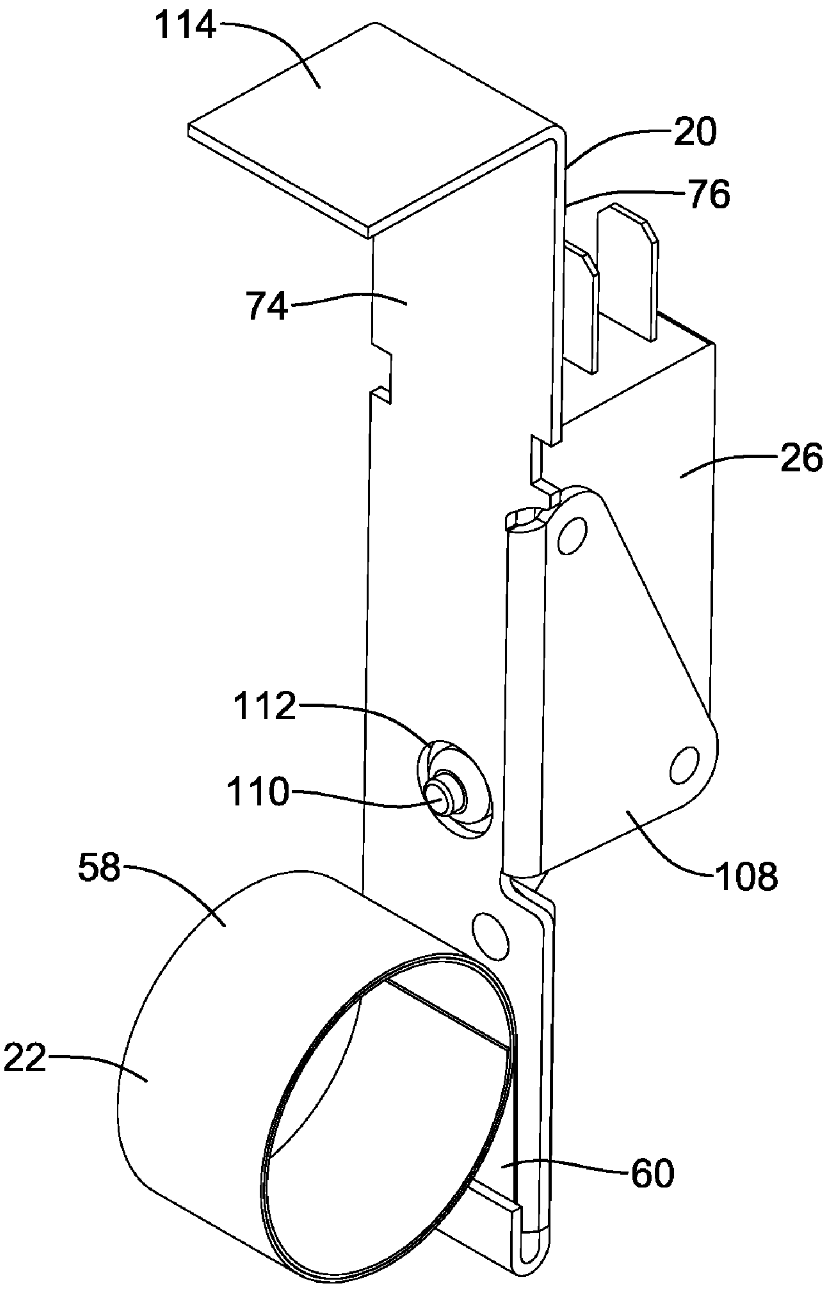
FIG. 8 is a perspective view of the spring clip and attached spring of the brush holder assembly of FIG. 1 with the spring in a wound, downward position.
Figure 8A:
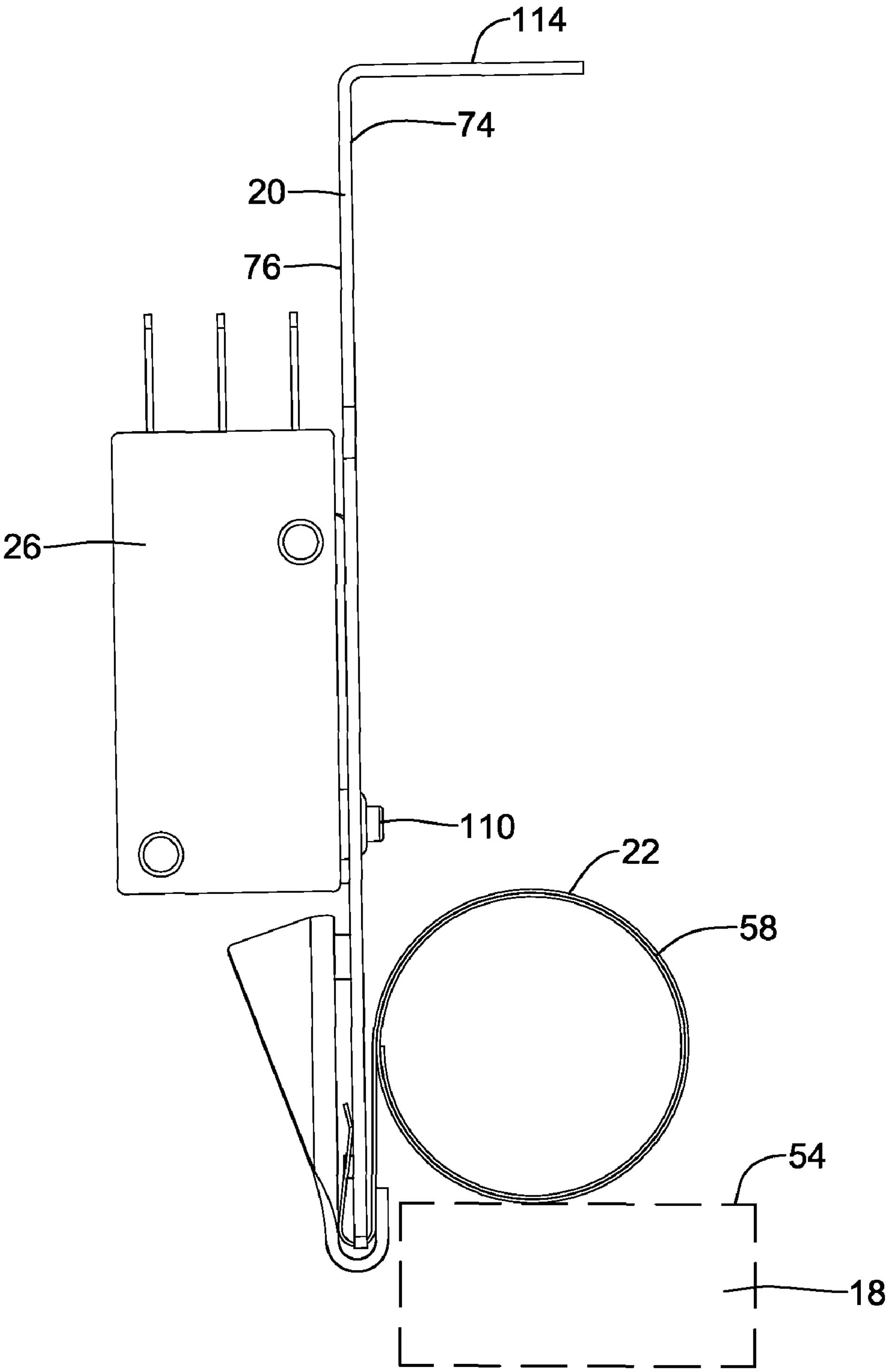
FIG. 8A is a side view of the spring clip and attached spring of FIG. 8.

Furthermore, as shown in FIG. 8A, when the brush 18 has been sufficiently worn down beyond a threshold length, the longitudinally extended portion 60 of the spring 22 is reduced in length and is no longer in contact with the button 110 of the switch 26, thus not depressing the button 110. When the button 110 of the switch 26 is actuated from the depressed state to the non-depressed state, the switch 26 may send a signal that the brush 18 has been sufficiently reduced in length such that the brush 18 and/or other components may need to be replaced and/or maintenance may need to be performed.

Thus, the button 110 of the switch 26 may be actuated by contact with the spring 22 of the brush holder assembly 10 to signal when a brush has diminished in length from a first length to a second length less than the first length. The spring 22 contacts and/or depresses the button 110 of the switch 26 when the brush 18 has a length greater than or equal to the first length, and the spring 22 does not contact and/or depress the button 110 of the switch 26 when the brush 18 has a length equal to or less than the second length. In some embodiments, the contact between the spring 22 and the button 110 of the switch 26 may be a non-conductive mechanical contact. Electrical continuity through the switch 26 may be established when the spring 22 contacts the button 110 of the switch 26 and/or may be interrupted when the spring 22 does not contact the button 110 of the switch 26, or vise versa.

Figure 9:
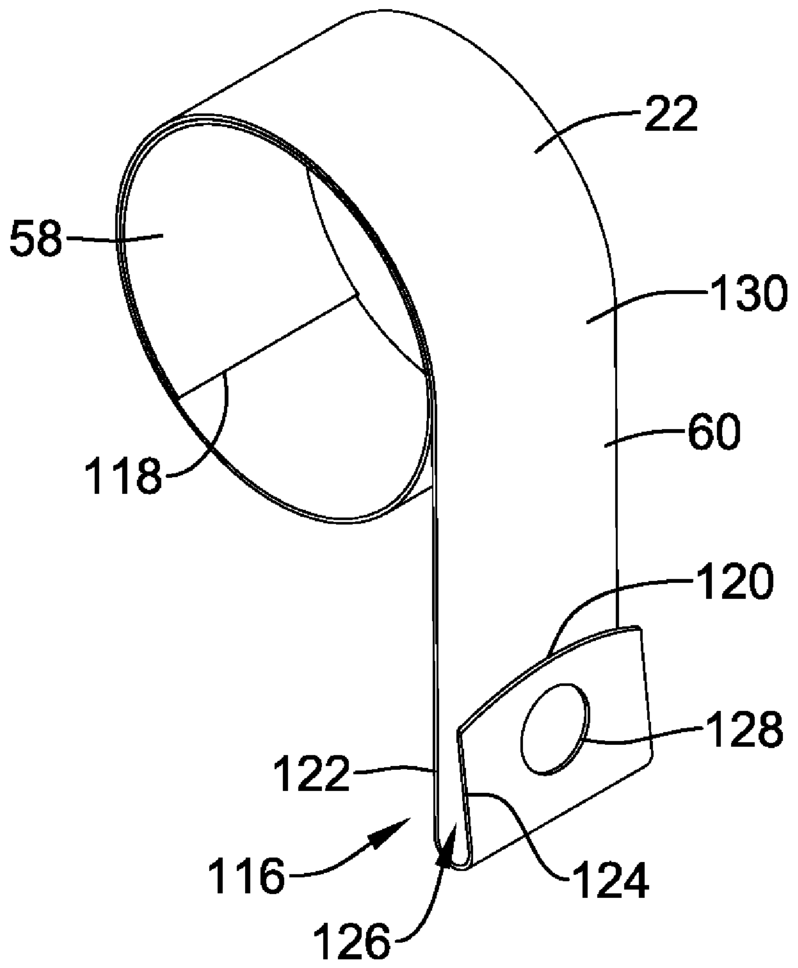
FIG. 9 is a perspective view of the spring of the brush holder assembly of FIG. 1.

A perspective view of the spring 22 is illustrated in FIG. 9. The spring 22 includes a coiled portion 58 and a longitudinally extended portion 60 (e.g., uncoiled portion) extending from the coiled portion 58 to the end region 116 of the spring 22. If a force sufficient to overcome the coiling force of the spring 22 is applied to the coiled portion 58 a portion of the coiled portion 58 of the spring 22 may be uncoiled, thus elongating the longitudinally extended portion 60 of the spring 22. In some embodiments, the spring 22 may be formed of an elongate strap 130 of spring material having a first end 118 and a second end 120. The first end 118 of the elongate strap 130 forming the spring 22 is located at the end of the innermost winding of the coiled region 58 of the spring 22.

The end region 116 of the spring 22 may be a doubled-over portion of the elongate strap 130 forming a U-shape or a J-shape, such that a first section 122 of the strap 130 of the spring 22 is facing a second section 124 of the strap 130 of the spring 22. In some embodiments there may be a gap 126 between the first section 122 and the second section 124. However, in other embodiments, the first section 122 may be in contact with the second section 124 of the strap 130. The second end 120 of the elongate strap 130 may be flared away from the first section 122 of the strap 130, facilitating entry of another component into the gap 126 between the first section 122 and the second section 124. The second section 124 of the strap 130 of the spring 22 may include a hole 128 extending through the second section 124 which may aid in coupling the spring 22 to the spring clip 20.

Figure 10:
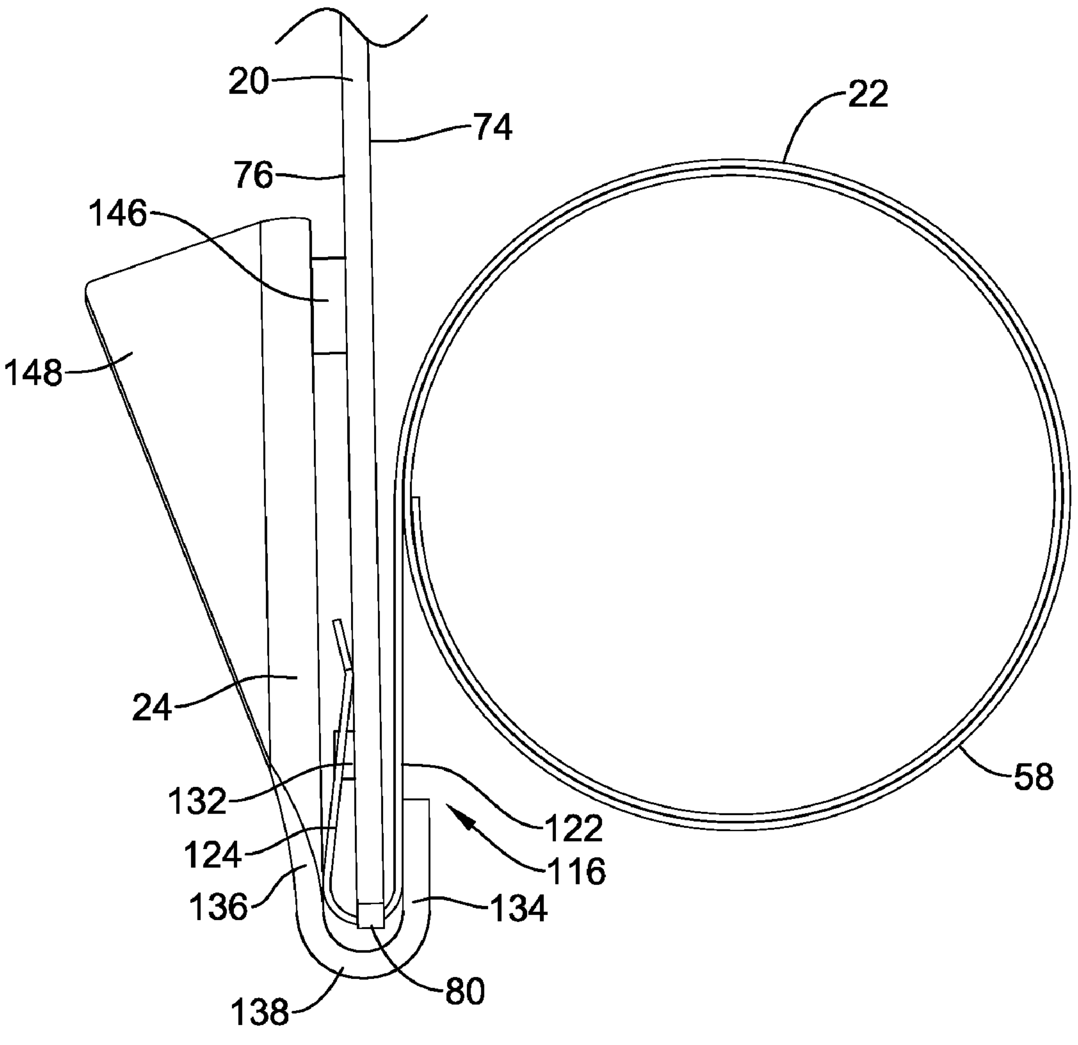
FIG. 10 is a side view of the spring coupled to the spring clip with the spring retainer retaining the spring on the spring clip.

FIG. 10 is a side view showing the spring 22 releasably coupled to the spring clip 20. As shown in FIG. 10, the end region 116 of the spring 22 extends around the second end 80 of the spring clip 20 such that a first portion of the spring 22 is facing the first surface 74 of the spring clip 20 and a second portion of the spring 22 is facing the second surface 76 of the spring clip 20. For example, the end region 116 of the spring 22 may extend around the second end 80 of the spring clip 20 such that the first section 122 of the strap 130 of the spring 22 is facing the first surface 74 of the spring clip 20 and the second section 124 of the strap 130 of the spring 22 is facing the second surface 76 of the spring clip 20. In this position, the coiled portion 58 of the spring 22 is oriented such that the coiled portion 58 and the longitudinally extending portion 60 extending from the coiled portion 58 are facing the first surface 74 of the spring clip 20.

The spring clip 20 may include a protrusion 132 extending from the second surface 76 of the spring clip 20. When the spring 22 is removably coupled to the spring clip 20, the protrusion 132 of the spring clip 20 may extend into the hole 128 through the second section 124 of the spring 22 facing the second surface 76 of the spring clip 20. When the spring 22 is removably coupled to the spring clip 20, the first section 122 of the spring 22 may be deflected away or further deflected away from the second section 124 of the spring 22 as the second section 124 comes into contact with the protrusion 132. The end region 116 of the spring 22 may be slid onto or slipped over the spring clip 20. As the spring 22 is oriented such that the protrusion 132 is located in the hole 128, the second section 124 of the spring 22 may spring back towards the first section 122 as the protrusion 132 may no longer be in contact with the second section 124 biasing the second section 124 away from the first section 122. Thus, the presence of the protrusion 132 in the hole 128 may help prevent the spring 22 from inadvertently slipping off the spring clip 20.

It is to be noted that although the protrusion 132 is shown extending from the second surface 76 of the spring clip 20, in other embodiments, the protrusion 132 may extend from the first surface 74 of the spring clip 20. In such an event, the first section 122 of the spring 22 may include a hole such that the protrusion of the spring clip 20 may extend into the hole through the first section 122 of the spring 22.

Furthermore, in some embodiments the distance between the first section 122 of the end region 116 of the spring 22 to the second section 124 of the end region 116 of the spring 22 across the gap 126 at the shortest point may be less than the thickness of the spring clip 20 from the first surface 74 to the second surface 76 of the spring clip 20. Thus, when the spring 22 is releasably coupled to the spring clip 20 (e.g., slipped over the second end 80 of the spring clip 20), the presence of a portion of the spring clip 20 in the gap 126 between the first section 122 and the second section 124 of the spring 22 causes the second section 124 to be urged away from the first section 122. The resilient forces of the end region 116 of the spring 22 attempt to bring the second section 124 back toward the first section 122, thus exerting compressive forces on the first surface 74 and the second surface 76 of the spring clip 20.

The spring clip 20 may include a spring retainer 24. The spring retainer 24 may extend around the second end 80 of the spring clip 20 over the end region 116 of the spring 22. In some embodiments the spring retainer 24 may be a J-shaped or U-shaped member. For example, the spring retainer 24 may include a first portion 134 extending over the first section 122 of the spring 22 on a first side of the spring clip 20, and the spring retainer 24 may include a second portion 136 extending over the second section 124 of the spring 22 on a second side of the spring clip 20. The presence of the spring retainer 24 extending over the end region 116 of the spring 22 prevents the spring 22 from being decoupled from the spring clip 20.

The spring retainer 24 may include a median region 138 joining the first portion 134 to the second portion 136. The median region 138 may be an arcuate portion of the spring retainer 24 located below the second end 80 of the spring clip 20, corresponding to the curved portion of the J-shape or U-shape of the spring retainer 24. In some embodiments, this median region 138, which covers the folded over portion of the spring 22 below the second end 80 of the spring clip 20 may help protect the spring 22 from harsh conditions such as heat generated from frictional contact between the brush 18 and the conductive surface 32 of the electrical device. Thus, the portion of the spring 22 extending around the second end 80 of the spring clip 20 would not be directly exposed to the conductive surface 32 and/or the heat dissipating from the conductive surface 32 of the electrical device, as the spring 22 would be shielded by the spring retainer 24.

The spring retainer 24 may be coupled to the spring clip 20. For example, the spring retainer 24 may be actuatably coupled to the spring clip 20. In other words, the spring retainer 24 may be movable from a first position to a second position while remaining coupled to the spring clip 20. For example, the spring retainer 24 may be pivotably coupled to the spring clip 20 such that the spring retainer 24 may pivot around a pivot point relative to the spring clip 20. As shown in FIG. 10, a pivot post 146 extending from the second surface 76 of the spring clip 20 may pivotably couple the spring retainer 24 to the spring clip 20. Thus, the spring retainer 24 may pivot about the axis of the pivot post 146 from a first position to a second position. In other embodiments, the pivot post 146 may extend from the spring retainer 24 to the spring clip 20, allowing the spring retainer 24 to pivot about the axis of the pivot post 146.

The spring retainer 24 may also include a tab 148 extending from the second portion 136 of the spring retainer 24. The tab 148 may extend from the second portion 136 at any desired angle, such as at an oblique angle or a perpendicular angle to the second portion 136. The tab 148 may be used to help actuate the spring retainer 24 as discussed herein.

Figure 11:
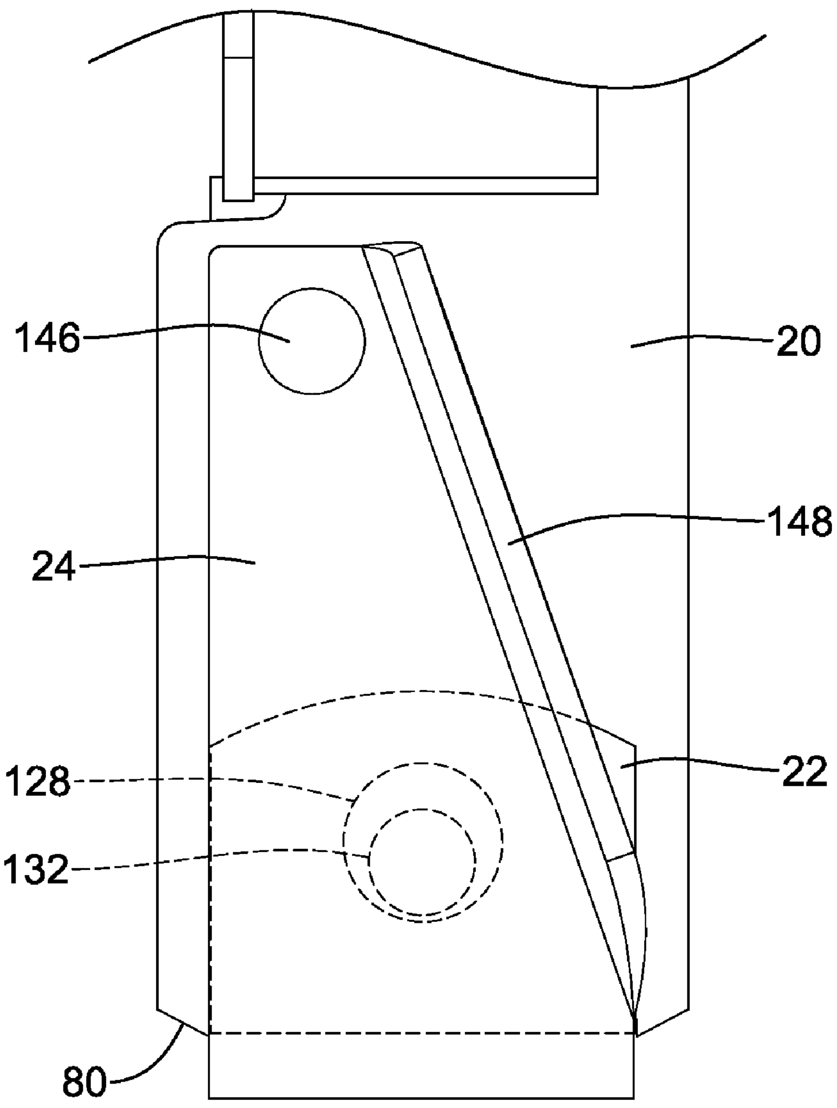
FIG. 11 is a view of the rear side of the spring clip showing the orientation of the spring retainer in a first position for retaining the spring on the spring clip.
Figure 12:
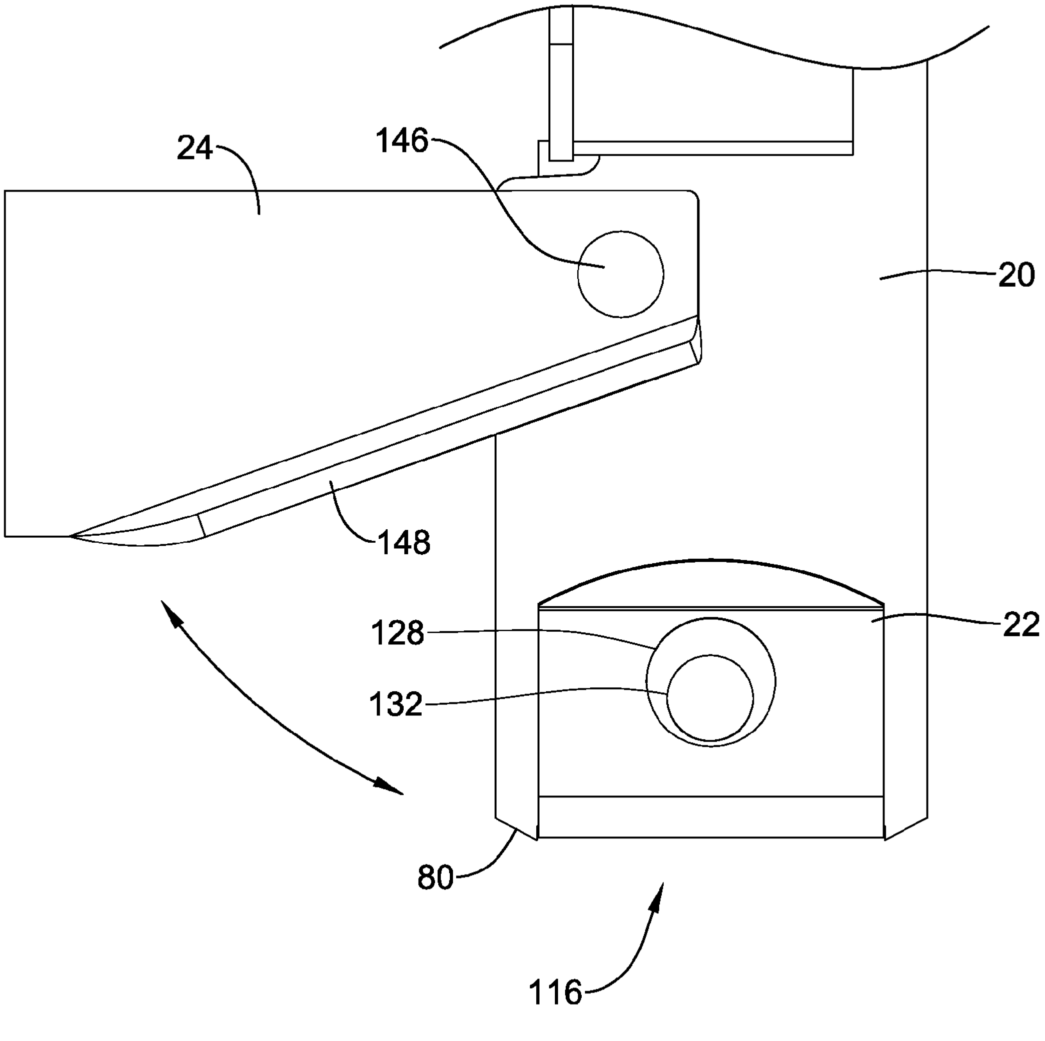
FIG. 12 is a view of the rear side of the spring clip showing the orientation of the spring retainer in a second position for removing the spring from the spring clip.

FIGS. 11 and 12 illustrate actuation of the spring retainer 24 to selectively retain the end region 116 of the spring 22 around the second end 80 of the spring clip 20 and/or selectively release the end region 116 of the spring 22 for removal from the spring clip 20.

In a first position, shown in FIG. 11, the spring retainer 24 may extend around the second end 80 of the spring clip 20 over the end region 116 of the spring 22, thus retaining the end region 116 of the spring 22 on the spring clip 20. Grasping the tab 148 of the spring retainer 24, or other portion of the spring retainer 24, the spring retainer 24 may be pivotably actuated to a second position shown in FIG. 12. In the second position, the spring retainer 24 is angled outward away from the spring clip 20. Thus, the spring retainer 24 goes through an arc of rotation between the first position and the second position as the spring retainer 24 is pivoted about the axis of the pivot post 146.

When the spring retainer 24 is located in the second position, the spring retainer 24 no longer extends around the second end 80 of the spring clip 20 over the end region 116 of the spring 22. Thus, in the second position the spring retainer 24 does not prevent the spring 22 from being uncoupled from the spring clip 20. The spring 22 only need be deflected slightly to disengage the protrusion 132 from the hole 128 as the spring is being slipped or slid off of the spring clip 20 to decouple the spring 22 from the spring clip 20. In other embodiments, not including a protrusion 132, the spring 22 may simply be slipped or slid off of, or otherwise disconnected from the spring clip 20 when the spring retainer 24 is pivoted to the second position shown in FIG. 12.

Figure 13:
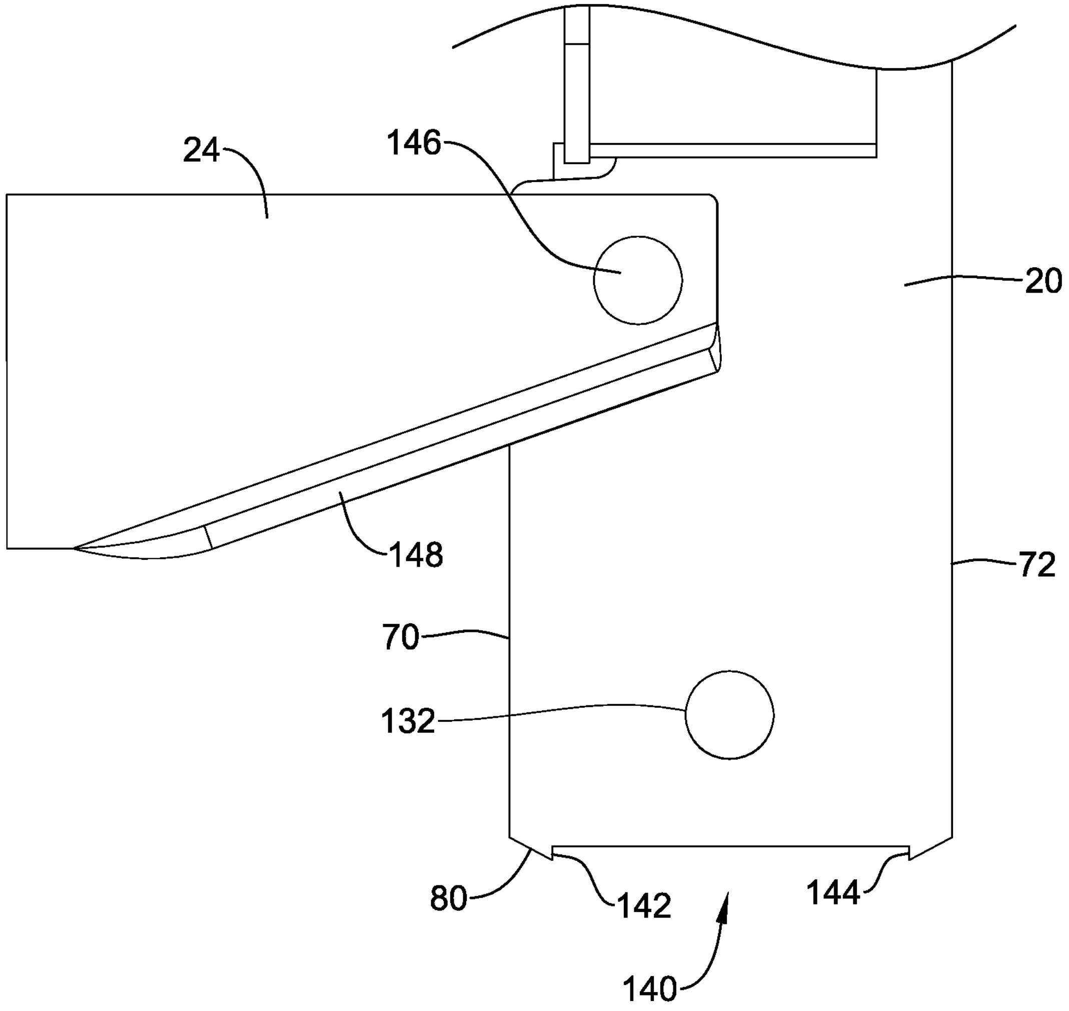
FIG. 13 is a view of the rear side of the spring clip with the spring removed.

FIG. 13 is a view of the spring clip 20 with the spring 22 removed. The protrusion 132 of the spring clip 20 is shown extending from the second surface 76 of the spring clip 20. Furthermore, as shown in FIG. 13, the second end 80 of the spring clip 20 may include a notch 140. The width of the notch 140 (i.e., the distance from the first edge 142 of the notch 140 proximate the first edge 70 of the spring clip 20 to the second edge 144 of the notch 140 proximate the second edge 72 of the spring clip 20) may be slightly larger than the width of the spring 22 such that a portion of the end region 116 of the spring 22 may be disposed in the notch 140 when the spring 22 is removably coupled to the spring clip 20. The notch 140 may help properly position the end region 116 of the spring 22 around the second end 80 of the spring clip 20 and/or may help prevent the spring 22 from laterally moving toward the first edge 70 or the second edge 72 of the spring clip 20, and thus may help prevent the spring 22 from inadvertently slipping off of the spring clip 20.

Figure 14:
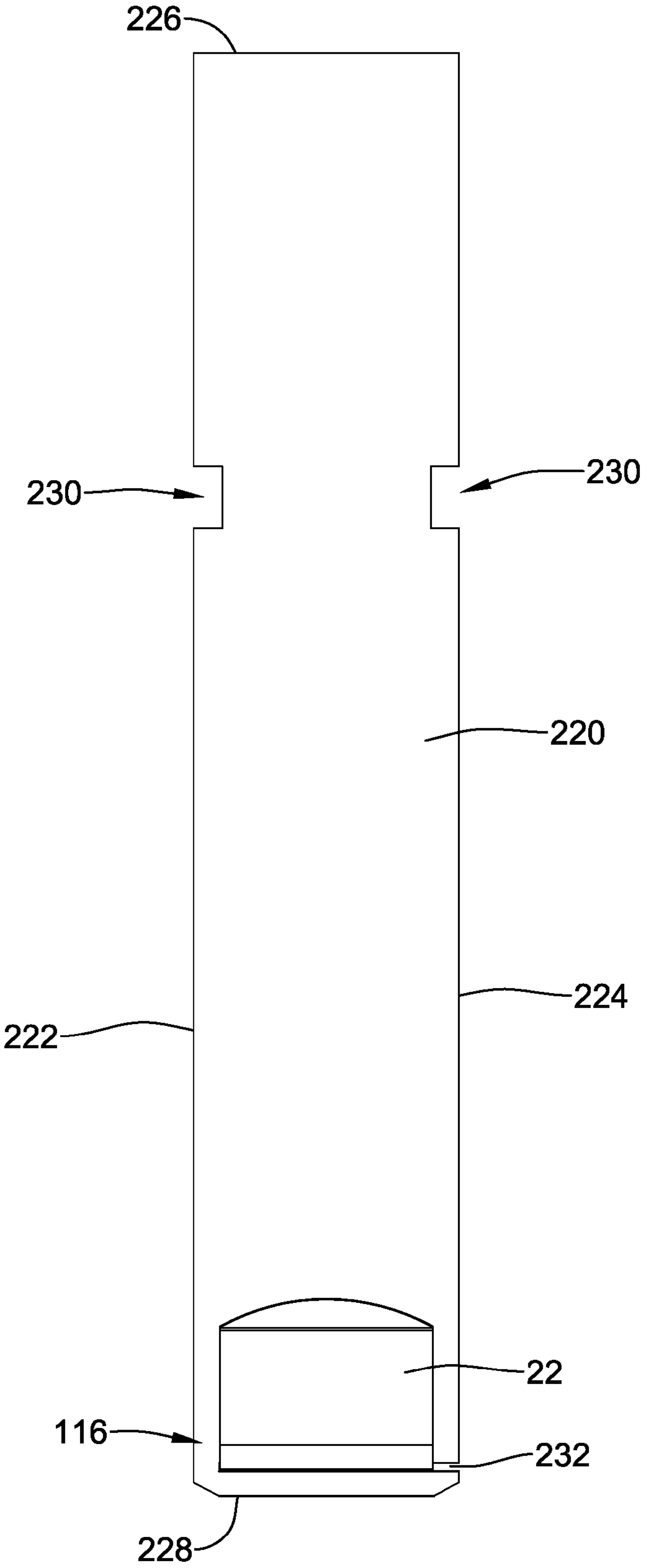
FIG. 14 illustrates an alternative embodiment of a spring clip for use in the brush holder assembly of FIG. 1.
Figure 15:
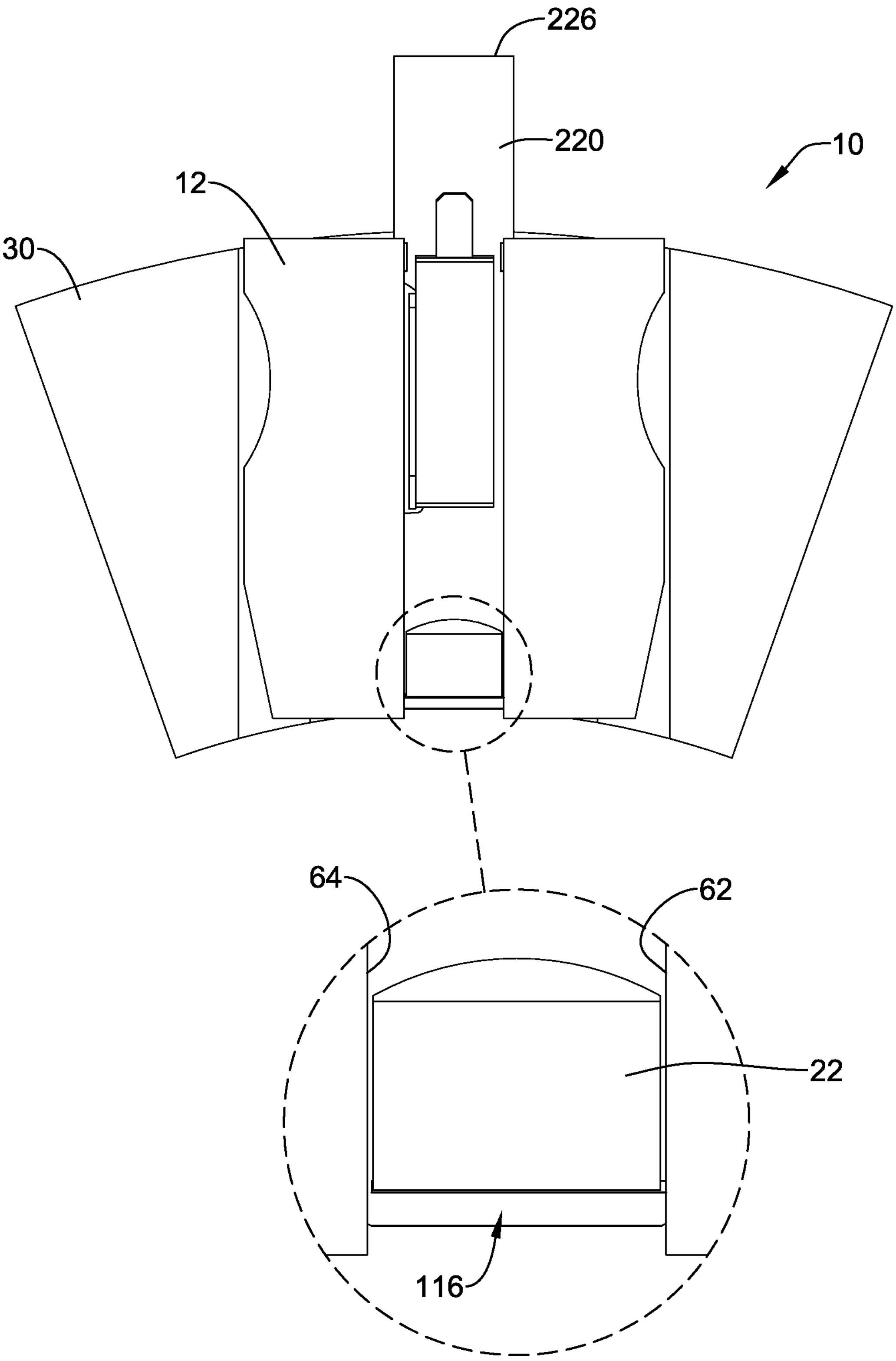
FIG. 15 illustrates the spring clip of FIG. 14 assembled in the brush holder assembly of FIG. 1.

FIGS. 14 and 15 illustrate an alternative embodiment of a spring clip 220 similar to the spring clip 20 for use in the brush holder assembly 10. The spring clip 220 may be substantially similar to the spring clip 20, with some noted differences indicated below. Thus, in the interest of brevity, similarities in the appearance, construction and operation of the spring clips 20, 220 will not be reiterated.

The spring clip 220 includes a first edge 222 extending from a first end 226 of the spring clip 220 to a second end 228 of the spring clip 220, and a second edge 224, opposite the first edge 222, extending from the first end 226 of the spring clip 220 to the second end 228 of the spring clip 220. The spring clip 220 may include a first notch 230 and/or a second notch 230 along one or both of the edges 222, 224 of the spring clip 220.

The spring clip 220 may also include a slot 232 extending through the spring clip 220 from the second edge 224 toward the first edge 222, but not all the way to the first edge 222 of the spring clip 220. The end region 116 of the spring 22 may be slid into the slot 232 such that a first portion of the spring 22 is facing a first side of the spring clip 220 and a second portion of the spring 22 is facing a second side of the spring clip 220. For example, the end region 116 of the spring 22 may be positioned through the slot 232 such that the first section 122 of the strap 130 of the spring 22 is facing a first surface of the spring clip 220 and the second section 124 of the strap 130 of the spring 22 is facing a second surface of the spring clip 220.

FIG. 15 illustrates the spring clip 220 inserted into the channels 86 extending along the edges 62, 64 of the brush holder 12. With the spring clip 220 inserted in the channels 86, the open side of the slot 232 is covered by the brush holder 12, thus preventing the spring 22 from sliding out of the slot 232. Therefore, when the spring clip 220 is installed in the brush holder assembly 10, the end region 116 of the spring 22 is positioned through the slot 232, with the edges 62, 64 of the brush holder 12 positioned on either side of the end region 116 of the spring 22. It is noted that, in other embodiments, the slot 232 may be an enclosed slot, not extending fully to the first edge 222 or the second edge 224 of the spring clip 220.

Figure 16:
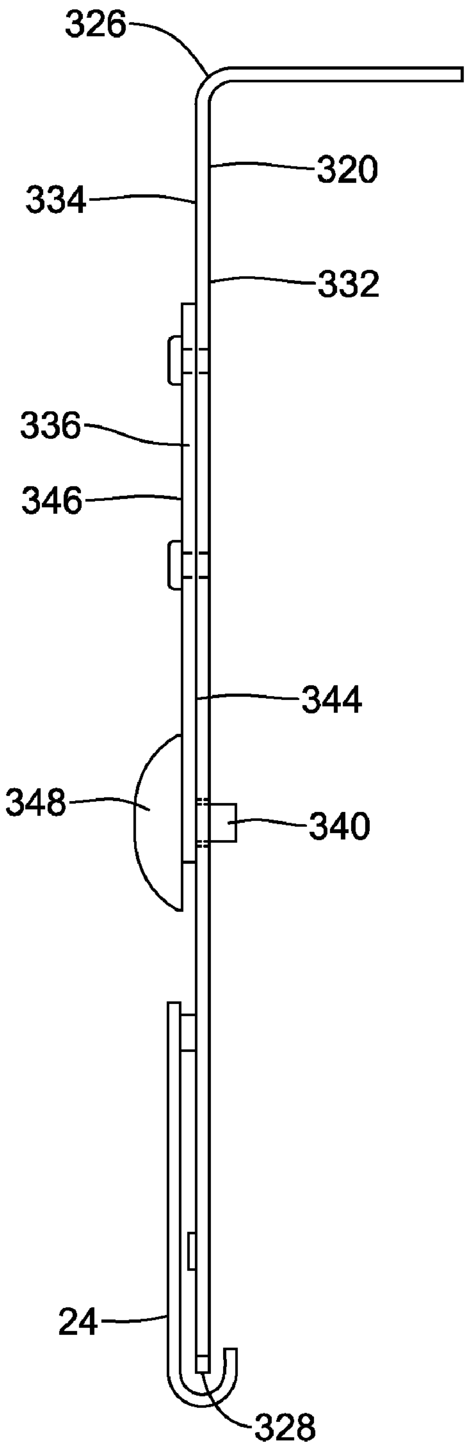
FIG. 16 is a side view of an alternative embodiment of a spring clip for use in a brush holder assembly.
Figure 17:
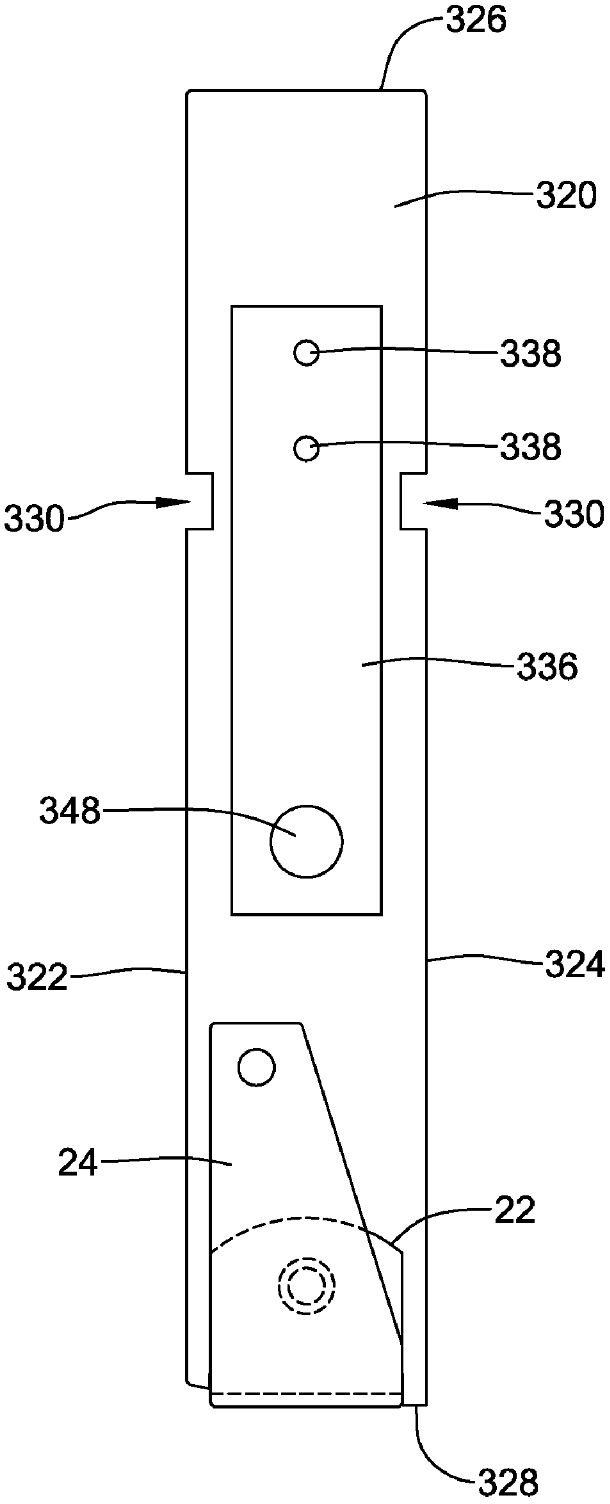
FIG. 17 is a rear view of the spring clip of FIG. 16.

FIGS. 16 and 17 illustrate yet another embodiment of a spring clip 320 similar to the spring clip 20 for use in the brush holder assembly 10. The spring clip 320 may be substantially similar to the spring clip 20, with some noted differences indicated below. Thus, in the interest of brevity, similarities in the appearance, construction and operation of the spring clips 20, 320 will not be reiterated.

The spring clip 320 includes a first edge 322 extending from a first end 326 of the spring clip 320 to a second end 328 of the spring clip 320, and a second edge 324, opposite the first edge 322, extending from the first end 326 of the spring clip 320 to the second end 328 of the spring clip 320. The spring clip 320 also includes a first surface 332 on a first side of the spring clip 320 extending between the first edge 322 and the second edge 324, and a second surface 334 on a second side of the spring clip 320, opposite the first surface 332, extending between the first edge 322 and the second edge 324. The spring clip 320 may include a first notch 330 and/or a second notch 330 along one or both of the edges 322, 324 of the spring clip 320.

The spring clip 320 may include a member 336, such as a flexible beam, including a first side 344 and a second side 346 fixedly coupled to the spring clip 320 at the connection point (s) 338. For example, the member 336 may be welded, screwed, bolted, riveted, or otherwise secured to the spring clip 320 at the connection point(s) 338. The connection point (s) 338 may be located closer to the upper end of the member 336 than the lower end of the member 336, allowing the lower end of the member 336 to cantilever or deflect away from the spring clip 320. The member 336 may extend along the second surface 334 of the spring clip 320. The member 336 may include a projection 340 extending from the first side 344 through an opening 342 through the spring clip 320 from the second surface 334 to the first surface 332 of the spring clip 320. The member 336 may also include a protuberance 348 extending from the second side 346 of the member 336.

Figure 18:
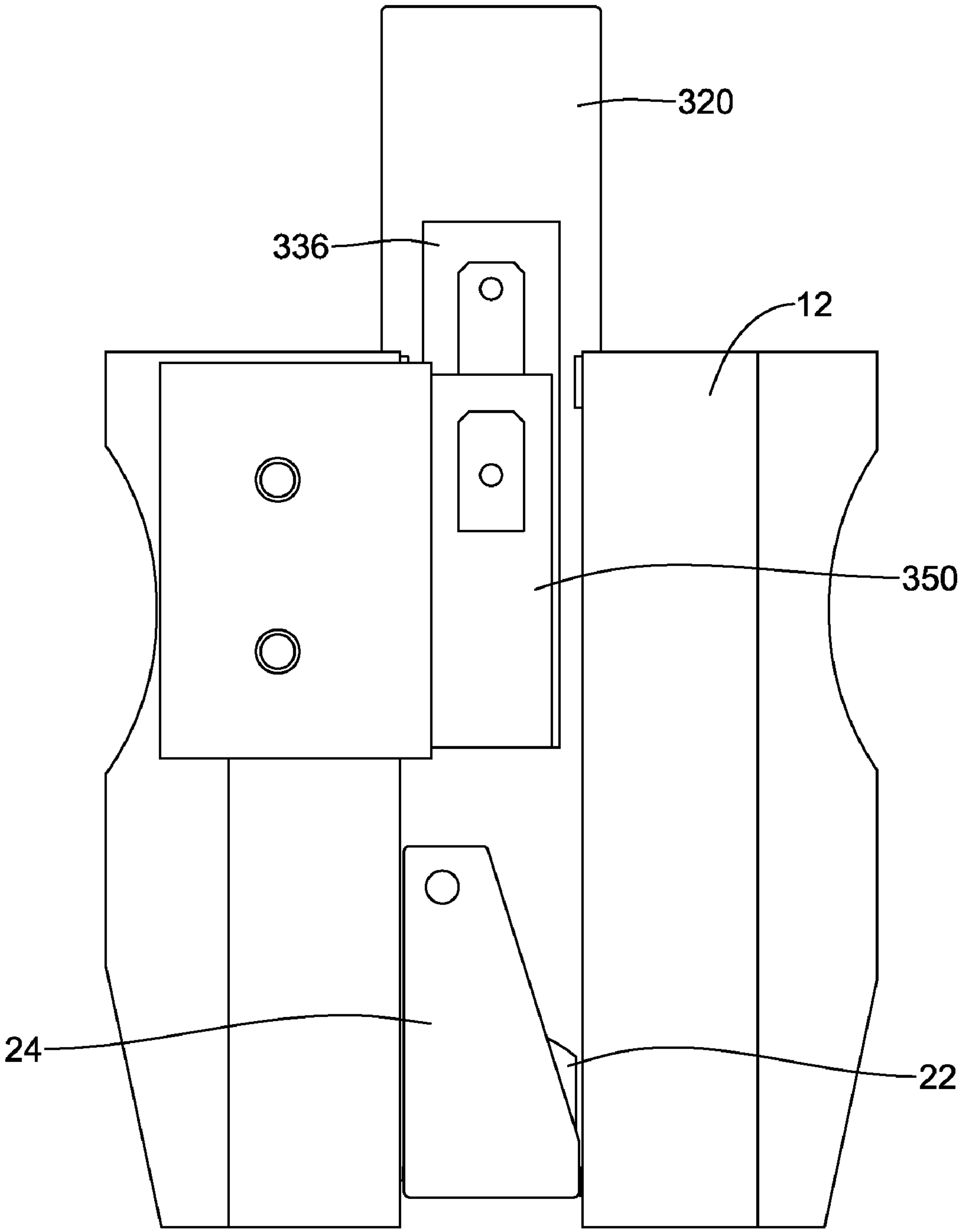
FIG. 18 is a plan view of a brush holder including a switch mounted to the brush holder.

FIG. 18 shows the brush holder 12 including a brush wear indicator switch 350 mounted to the brush holder 12, similar to the switch 26. The switch 350 may be configured to indicate when the brush 18 has worn beyond a threshold amount through frictional contact with the conductive surface 32. The switch 350 may generate a signal which indicates to an operator, monitor or other personnel that the brush 18 and/or other components may need to be replaced and/or maintenance may need to be performed on the brush holder assembly 10.

Figure 19:
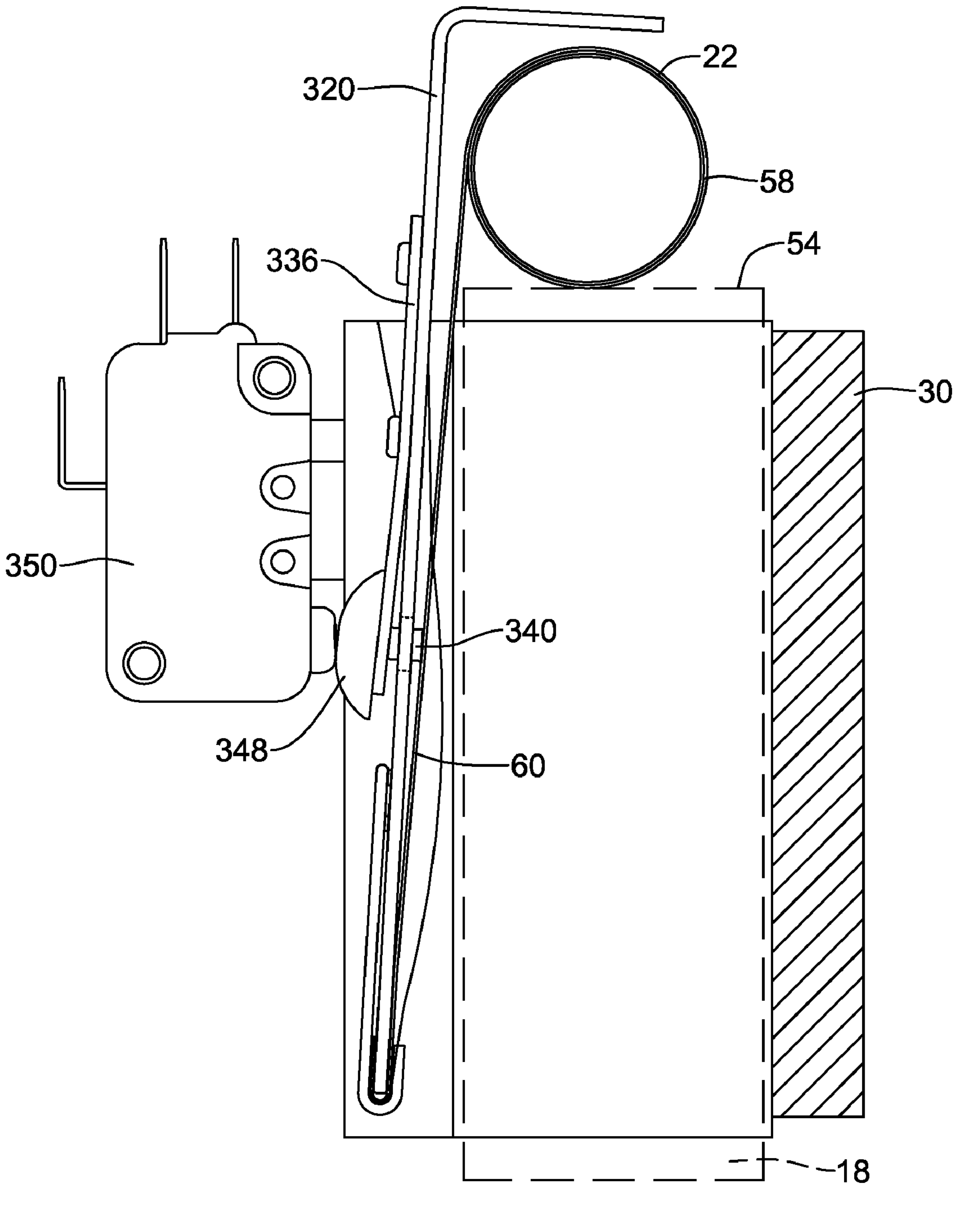
FIG. 19 is a cut-away side view of the brush holder of FIG. 18 including the spring clip of FIG. 16, showing the spring in an unwound, upward position.
Figure 20:
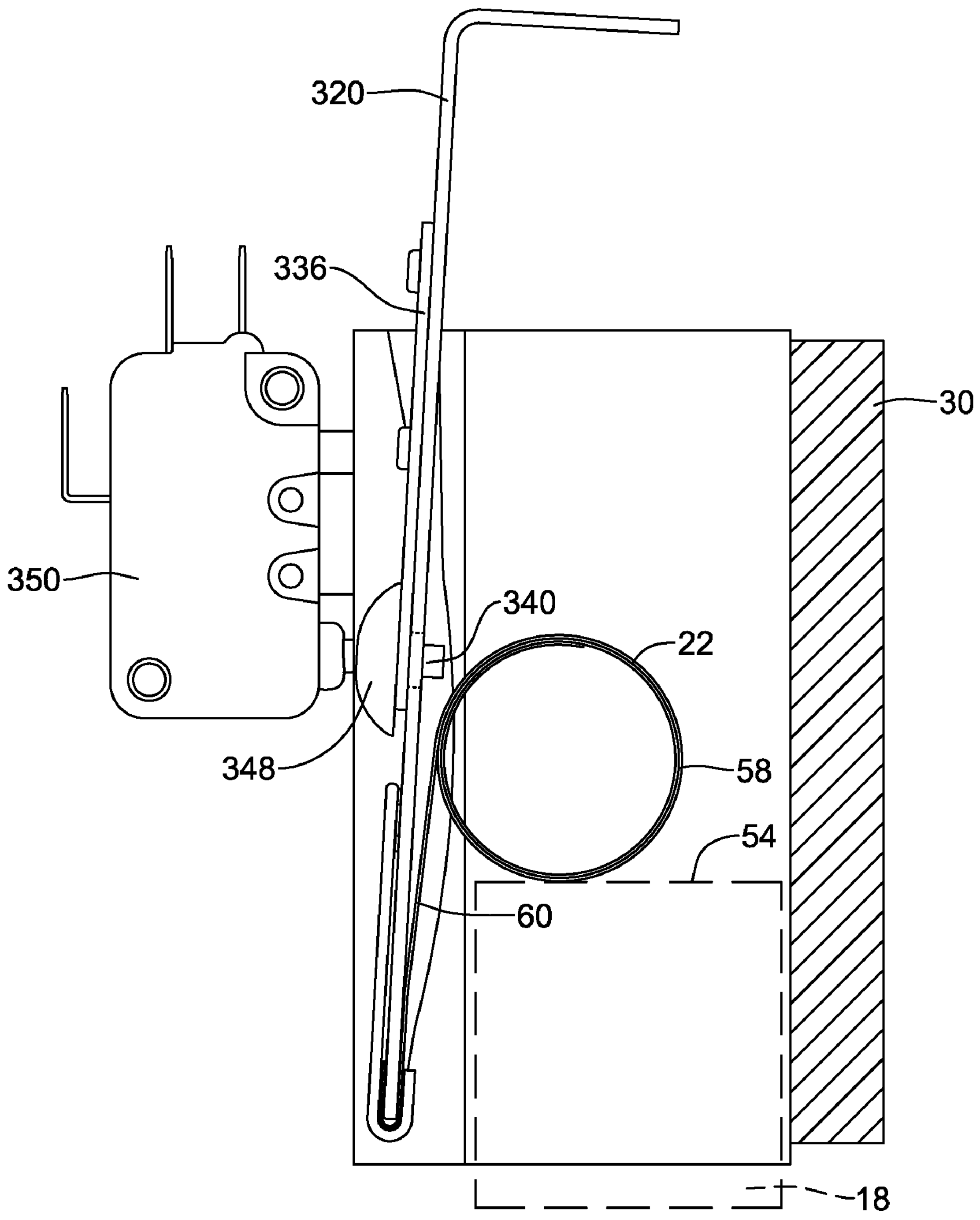
FIG. 20 is a cut-away side view of the brush holder of FIG. 18 including the spring clip of FIG. 16, showing the spring in a wound, downward position.

FIGS. 19 and 20 illustrate the interaction between the spring 22, the member 336 of the spring clip 320 and the switch 350 in signaling brush wear during operation of an electrical device. FIG. 19 shows a brush 18 (in phantom) associated with the spring 22 and spring clip 320 of the brush holder assembly 10. When the brush 18 is installed in the brush holder assembly 10, the coiled portion 58 of the spring 22 is located on the top surface 54 of the brush 18, while the longitudinally extended portion 60 of the spring 22 is located between the brush 18 and the spring clip 320. As shown in FIG. 19, when the brush 18 is sufficiently long (i.e., longer than a threshold length), the longitudinally extended portion 60 of the spring 22 extends along a substantial portion of the spring clip 320 and contacts the projection 340 of the member 336 which is extending through the spring clip 320, deflecting the member 336 outward away from the brush 18. When the spring 22 contacts the projection 340 of the member 336, the protuberance 348 of the member 336 in turn contacts the switch 350, such as a button on the switch 350 and/or opens or closes an electrical circuit in the switch 350. In some embodiments, the contact between the spring 22 and the button of the switch 350 may be a non-conductive mechanical contact. Electrical continuity through the switch 350 may be established when the spring 22 contacts the projection 340 of the member 336 and/or may be interrupted when the spring 22 does not contact the projection 340 of the member 336, or vise versa.

Furthermore, as shown in FIG. 20, when the brush 18 has been sufficiently worn down beyond a threshold length, the longitudinally extended portion 60 of the spring 22 is no longer in contact with the projection 340 of the member 336, thus the member 336 is not deflected outward away from the brush 18. Thus, the protuberance 348 of the member 336 may in turn move out of contact with the switch 350, such as out of contact with a button on the switch 350 and/or closes or opens an electrical circuit in the switch 350. When the switch 350 is actuated from the state shown in FIG. 19 to the state shown in FIG. 20, the switch 350 may send a signal that the brush 18 has been sufficiently reduced in length such that the brush 18 and/or other components may need to be replaced and/or maintenance may need to be performed.

Thus, the switch 350 may be actuated by contact/non-contact between the spring 22 of the brush holder assembly 10 and the projection 340 of the member 336 of the spring clip 320 to signal when the brush 18 has diminished in length from a first length to a second length less than the first length. The spring 22 contacts the projection 340 and thus puts the switch 350 in a first state when the brush 18 has a length greater than or equal to the first length, and the spring 22 does not contact the projection 340 and thus puts the switch 350 in a second state when the brush 18 has a length equal to or less than the second length.

The signal generated by the switch 350 when the state of the switch 350 is shifted from a first state to a second state may be used to notify an operator, monitor or other personnel that the brush 18 and/or other components may need to be replaced and/or maintenance may need to be performed on the brush holder assembly 10.

Figure 21:
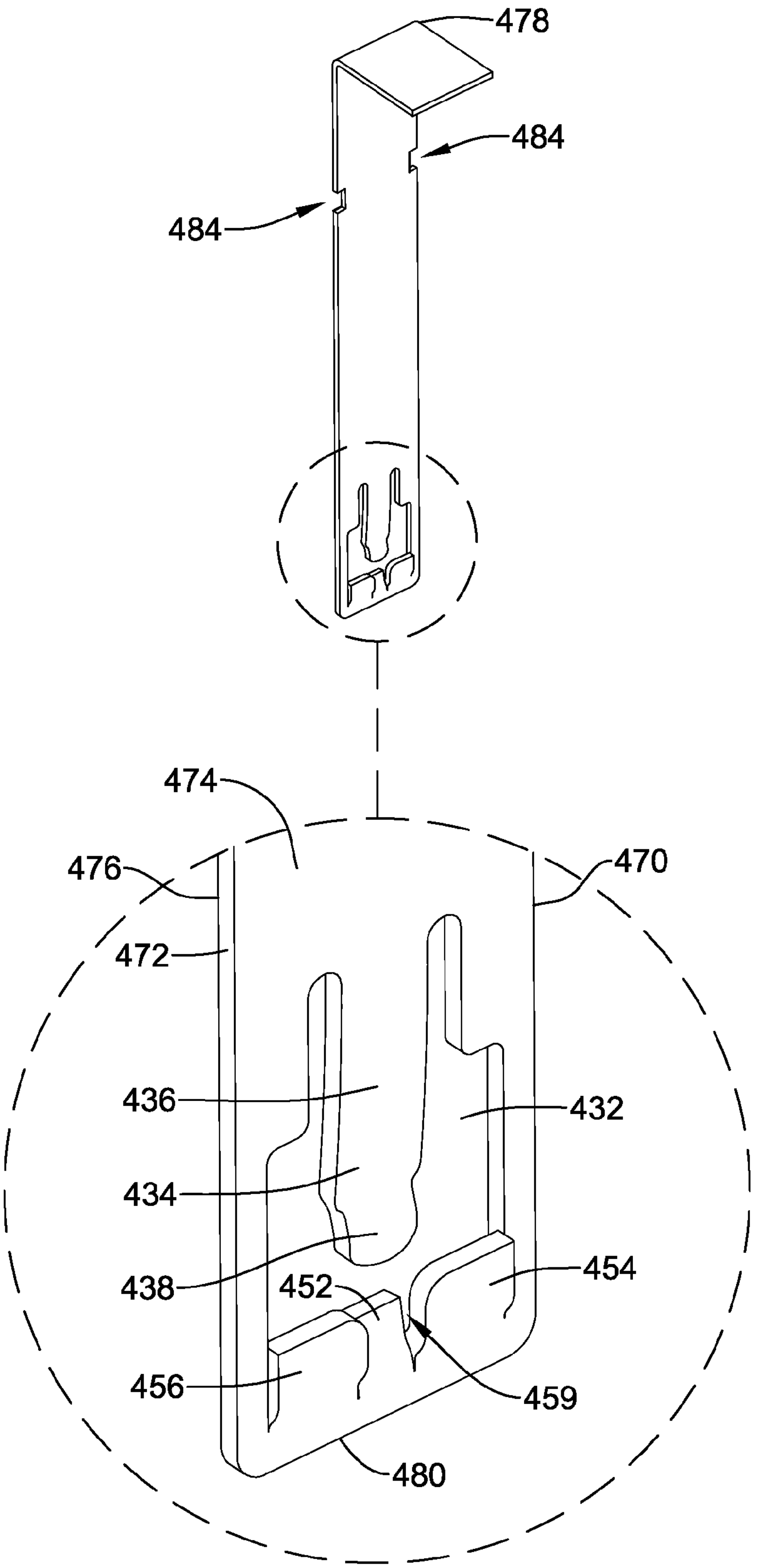
FIGS. 21 and 22 are front and rear perspective views illustrating an another alternative embodiment of a spring clip for use in the brush holder assembly of FIG. 1.
Figure 22:
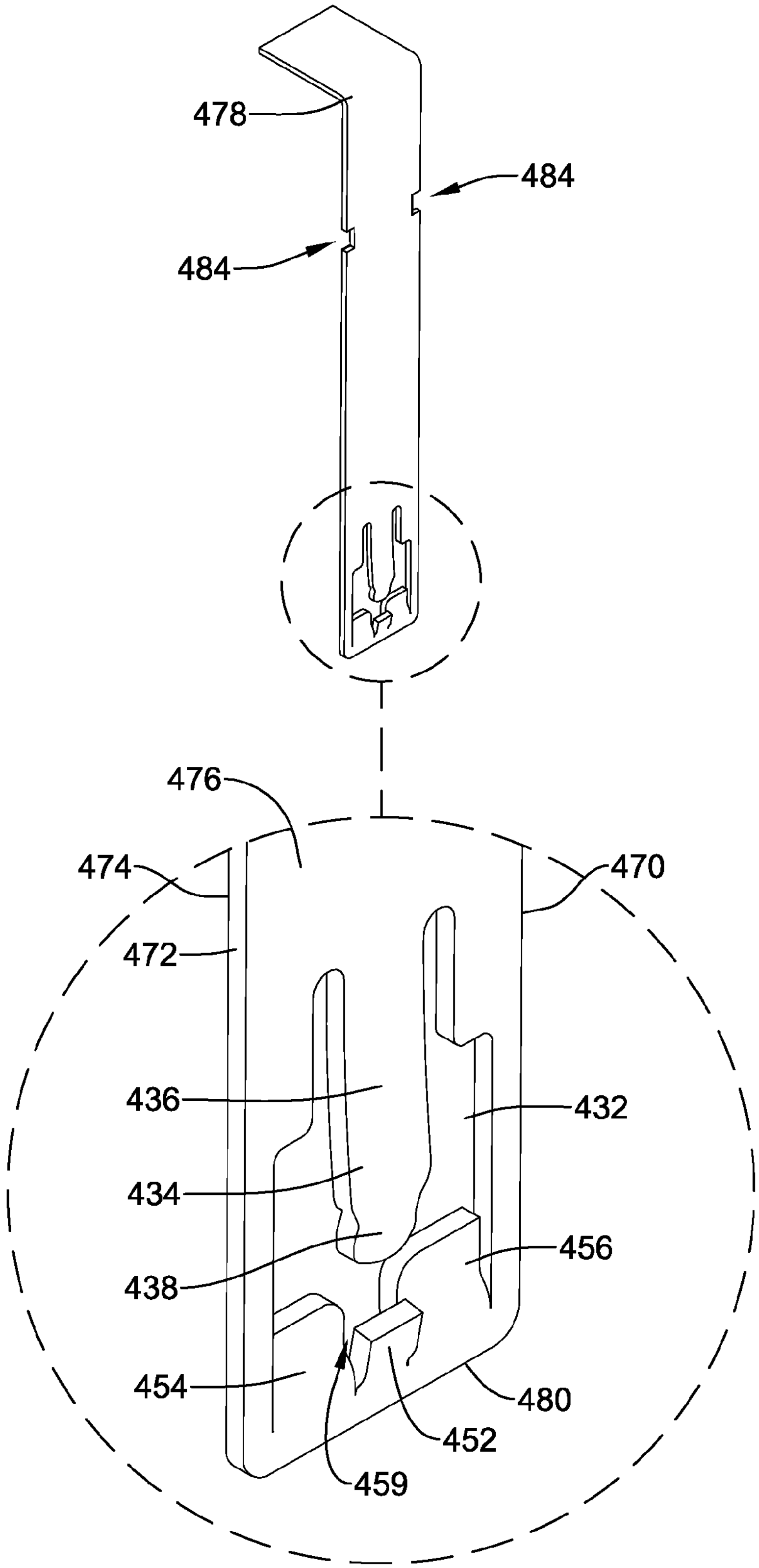

FIGS. 21 and 22 are front and rear perspective views, respectively, illustrating another alternative spring clip 420 which may used with the brush holder 12 of FIGS. 1 and 2, or another brush holder. The spring clip 420 may be similar to the spring clip 20, with some noted differences indicated below. Thus, in the interest of brevity, similarities in the appearance, construction and operation of the spring clips 20, 420 will not be reiterated.

The spring clip 420 includes a first edge 470 extending from a first end 478 of the spring clip 420 to a second end 480 of the spring clip 420, and a second edge 472, opposite the first edge 470, extending from the first end 478 of the spring clip 420 to the second end 480 of the spring clip 420. The spring clip 420 also includes a first surface 474 on a first side of the spring clip 420 extending between the first edge 470 and the second edge 472, and a second surface 476 on a second side of the spring clip 420, opposite the first surface 474, extending between the first edge 470 and the second edge 472. The spring clip 420 may include a first notch 484 and/or a second notch 484 along one or both of the edges 470, 472 of the spring clip 420.

The spring clip 420 also includes an opening 432 proximate the second end 480 of the spring clip 420 extending through the spring clip 420 from the first surface 474 to the second surface 476. The opening 432 may have a width (e.g., the direction orthogonal to the first and second edges 470, 472 of the spring clip 420) greater than the width of the spring 422, discussed at FIG. 23, such that the end region 416 of the spring 422 may be disposed in the opening 432. A flexible tang or tongue 434 of the spring clip 420 may extend into the opening 432 from the main body portion of the spring clip 420. The flexible tongue 434 may be flexible such that the tongue 434 may be flexed or deflected from an equilibrium position while detachably coupling a spring 422 to the spring clip 420. The tongue 434 may extend into the opening 432 from an upper edge of the opening 432 (e.g., an edge nearest the first end 478 of the spring clip 420) toward a lower edge of the opening 432 (e.g., an edge nearest the second end 480 of the spring clip 420). The tongue 434 may include a base portion 436 fixed to the main body portion, extending to an end portion 438. As shown in the figures, the tongue 434 may extend into the opening 432 such that the tongue 434 may be surrounded by the opening 432 on three sides (e.g., first and second side edges, and an end edge of the tongue 434). The tongue 434 may be a long, narrow portion of the spring clip 420 connected with the main body of the spring clip 420 at one end only. In some embodiments, the tongue 434 may be a unitary portion of the spring clip 420, while in other embodiments the tongue 434 may be a separate component attached to the spring clip 420, such as with a fastener, rivet, weld, solder or other attachment means. The end portion 438 of the tongue 434 may extend from the base portion 436 at an angle, such as an oblique or perpendicular angle, in some embodiments. For example, the end portion 438 of the tongue 434 may be bent out of the plane through which the base portion 436 of the tongue 434 lies.

The spring clip 420 may also include a plurality of tabs, such as first and second side tabs 454, 456 and a central tab 452 located between the first and second side tabs 454, 456. The first and second side tabs 454, 456 and the central tab 452 may extend into the opening 432 from the main body portion of the spring clip 420 from a lower edge of the opening 432 (e.g., an edge nearest the second end 480 of the spring clip 420) toward an upper edge of the opening 432 (e.g., an edge nearest the first end 478 of the spring clip 420).

The first and second side tabs 454, 456 may be bent or otherwise extend away from the plane through which the main body portion of the spring clip 420 lies. For example, the first and second side tabs 454, 456 may extend at an angle, such as an oblique angle, from the main body portion of the spring clip 420. The central tab 452, between the first and second side tabs 454, 456, may also be bent or otherwise extend away from the plane through which the main body portion of the spring clip 420 lies. For example, the central tab 452 may extend at an angle, such as an oblique angle, from the main body portion of the spring clip 420. The first and second side tabs 454, 456 may extend outward from a first planar surface (e.g., the first surface 474 or the second surface 476) of the spring clip 420 while the central tab 452 may extend outward from a second planar surface (e.g., the second surface 476 or the first surface 474) of the spring clip 420. The first and second side tabs 454, 456 may generally extend in an opposing direction from the central tab 452, forming a channel 459, such as a V-shaped or U-shaped channel, between the first and second side tabs 454, 456 and the central tab 452.

Figure 23:
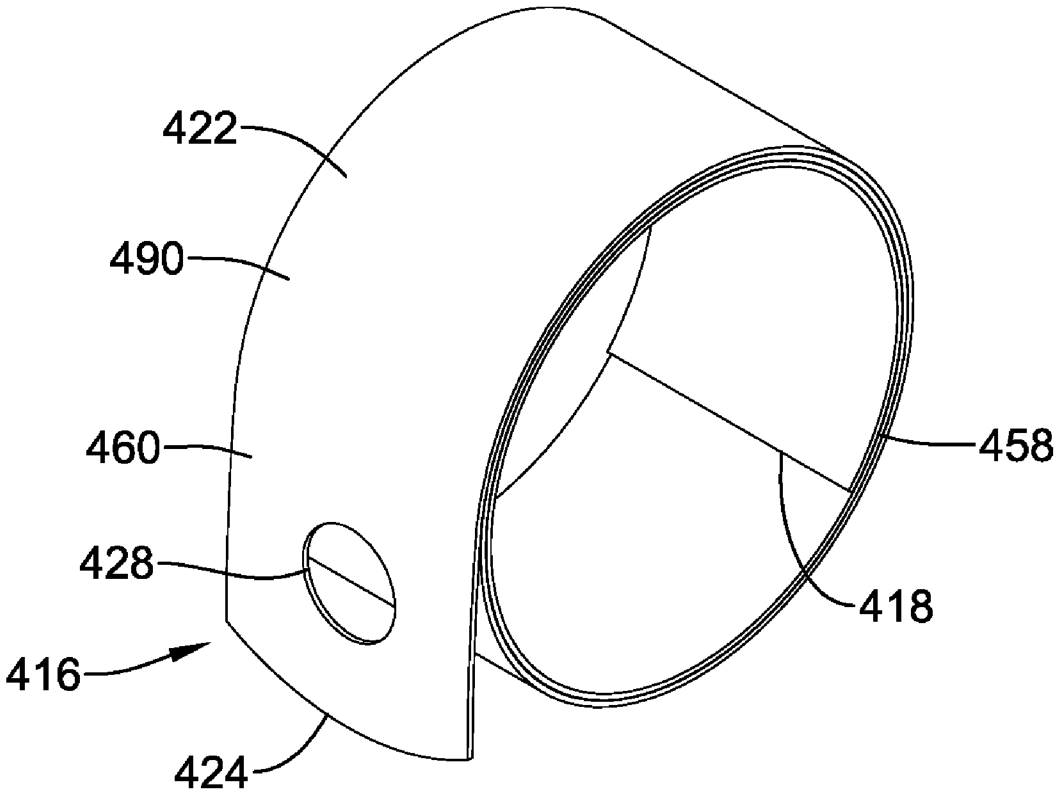
FIG. 23 is a perspective view illustrating a spring for use with the spring clip of FIGS. 21 and 22.

FIG. 23 is a perspective view of a spring 422 which may be detachably coupled to the spring clip 420 of FIGS. 21 and 22. The spring 422 includes a coiled portion 458 and a longitudinally extended portion 460 (e.g., uncoiled portion) extending from the coiled portion 458 to the end region 416 of the spring 422. If a force sufficient to overcome the coiling force of the spring 422 is applied to the coiled portion 458 a portion of the coiled portion 458 of the spring 422 may be uncoiled, thus elongating the longitudinally extended portion 460 of the spring 422. In some embodiments, the spring 422 may be formed of an elongate strap 490 of spring material having a first end 418 and a second end 424. The first end 418 of the elongate strap 490 forming the spring 422 is located at the end of the innermost winding of the coiled region 458 of the spring 422. The end region 416 of the spring 422 may include a hole 428, such as a circular, oval, oblong, square, rectangular, or other shaped opening, extending through the strap 490 which may aid in coupling the spring 422 to the spring clip 420.

Figure 24:
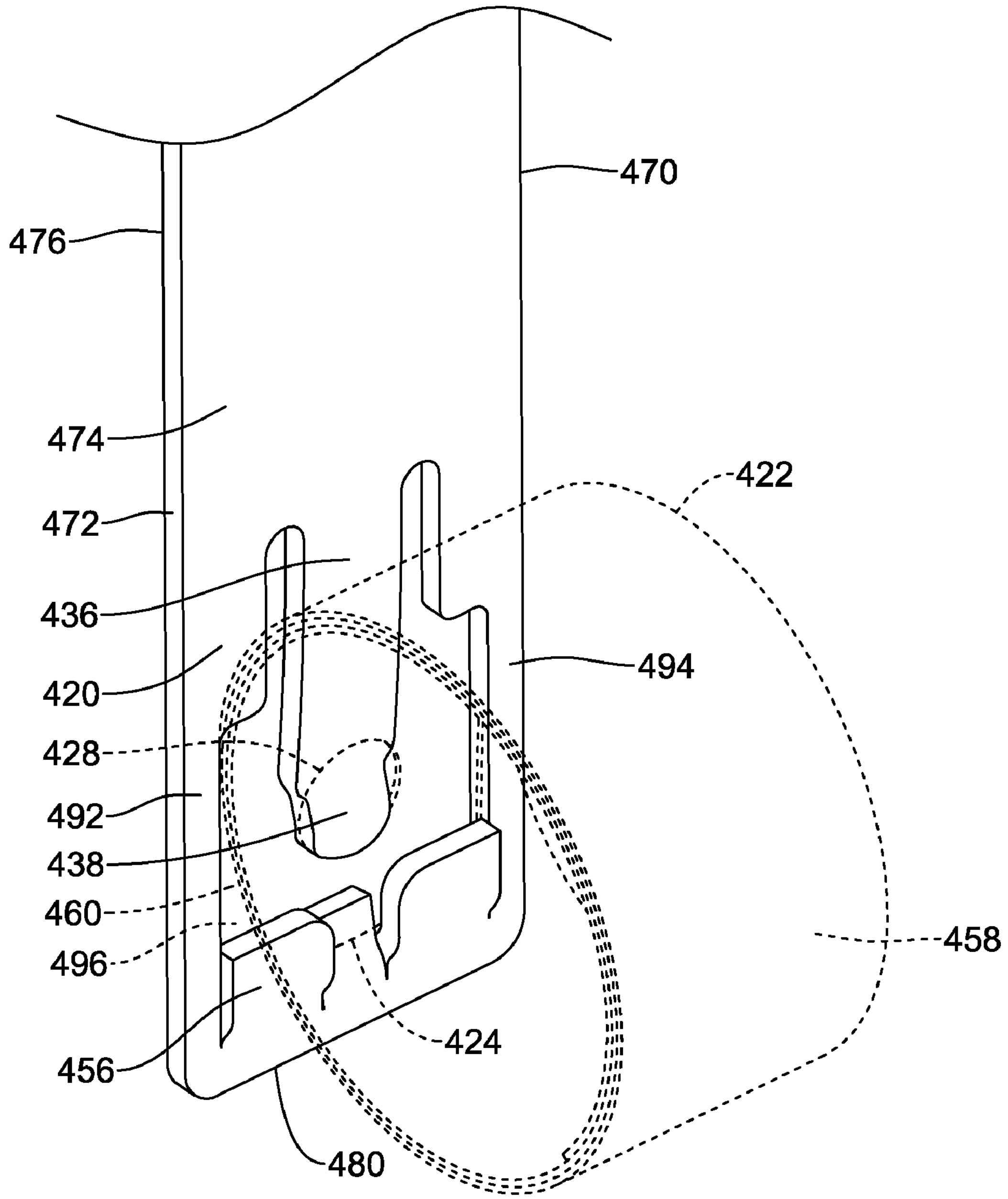
FIGS. 24 and 25 are front and rear perspective views illustrating the spring of FIG. 23 detachably coupled to the spring clip of FIGS. 21 and 22.
Figure 25:
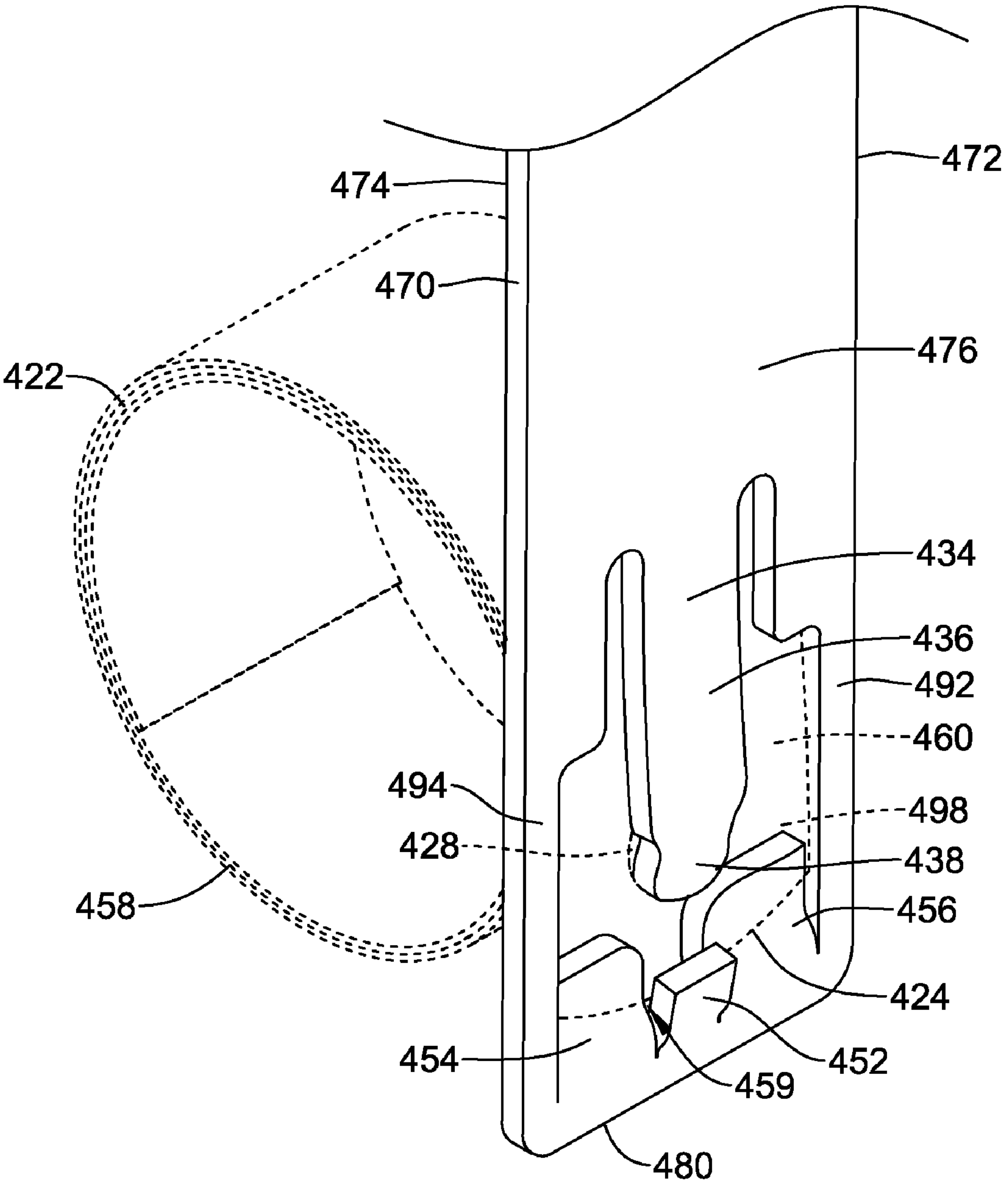

FIGS. 24 and 25 are front and rear perspective views, respectively, showing the spring 422 releasably coupled to the spring clip 420. With the spring 422 located on the side of the spring clip 420 including the first surface 474, the end region 416 of the spring 422 may be positioned in the opening 432 such that the end region 416 of the spring 422 is disposed between side portions 492, 494 of the spring clip 420, which at least partially define side edges of the opening 432. The second end 424 of the spring 422 is positioned in the channel 459 defined between the side tabs 454, 456 and the central tab 452 of the spring clip 420 such that the two side tabs 454, 456 are located on one side of the end region 416 of the spring 422 and the central tab 452 is located on a second side of the end region 416 of the spring 422, opposite the first side of the end region 416 of the spring 422. As shown in the figures, the first and second side tabs 454, 456 are located on the first side 496 of the spring 422 and the central tab 452 is located on the second side 498 of the spring 422. However, in other embodiments in which the direction that the tabs 542, 454 and 456 extend is reversed, the first and second side tabs 454, 456 may be located on the second side 498 of the spring 422 and the central tab 452 may be located on the first side 496 of the spring 422.

With the end region 416 of the spring 422 located in the channel 459 and between the central tab 452 and the first and second side tabs 454, 456, the end portion 438 of the flexible tongue 434, which may be considered a projection or a protuberance in some embodiments, may extend into and/or through the hole 428 of the end region 416 of the spring 422. With the end portion 438 of the tongue 434 positioned in the hole 428, the base portion 436 of the tongue 434 may face, extend along and/or contact the second surface 498 of the spring 422. In other words, the base portion 436 of the tongue 434 may be located on the second side 498 of the end region 416 of the spring 422 (i.e., the side away from the coiled portion 458) when the end portion 438 of the tongue 434 is positioned in the hole 428 of the spring 422.

Figure 26:
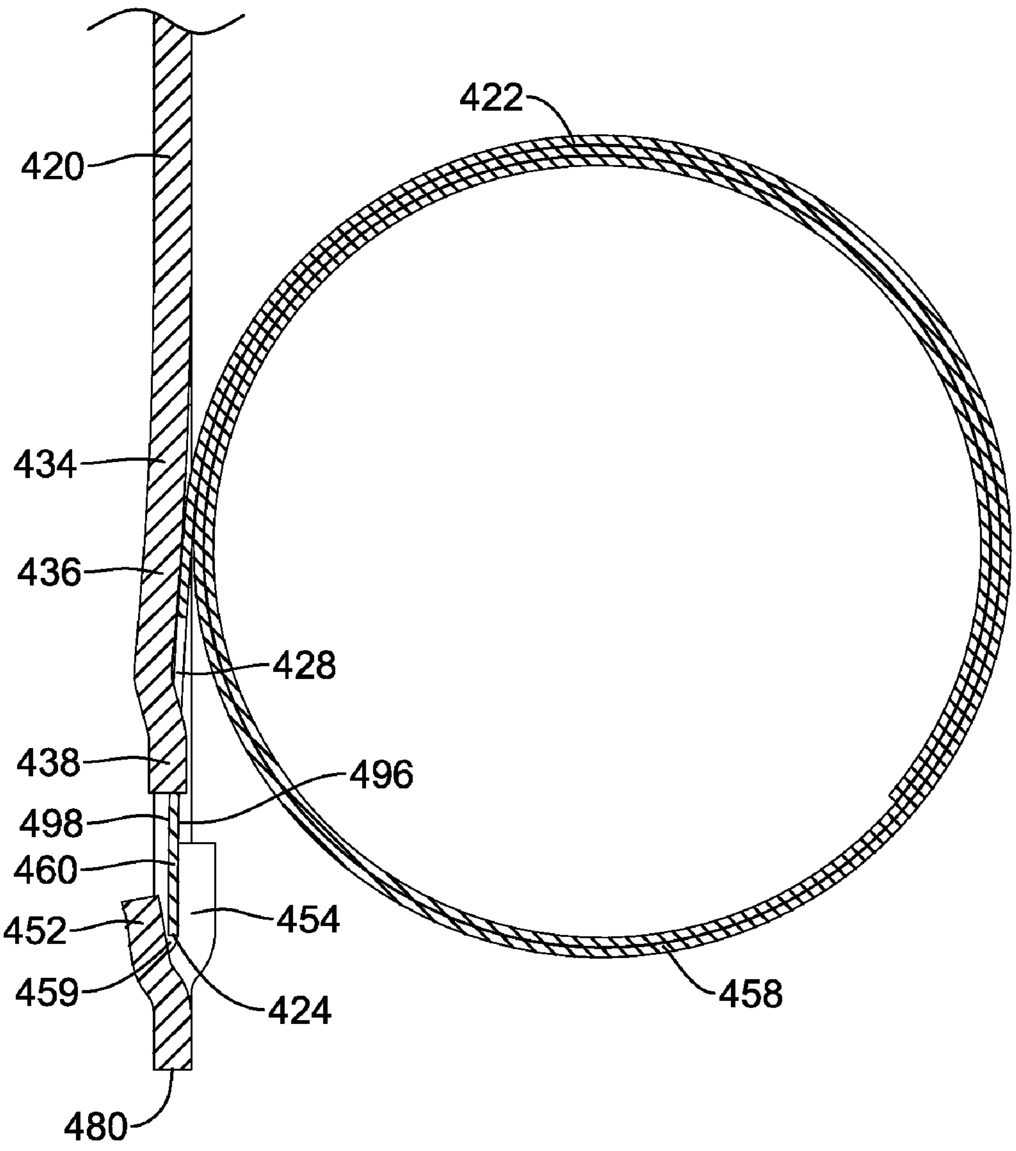
FIG. 26 is a longitudinal cross-sectional view taken along the longitudinal midplane of the spring clip of FIGS. 21 and 22 illustrating the interaction of the spring clip with the spring of FIG. 23.

FIG. 26 is a longitudinal cross-sectional view taken along the longitudinal midplane of the spring clip 420 illustrating the interaction of the spring clip 420 with the spring 422 when the spring 422 is detachably coupled to the spring clip 420. As shown in FIG. 26, when the end portion 438 of the tongue 434 is positioned in the hole 428 of the spring 422, a lower edge of the end portion 438 may contact an edge of the hole 428. Thus, upward force applied to the spring 422 causes the edge of the hole 428 to engage the edge of the end portion 438 of the tongue 434. With the end portion 438 positioned in the hole 428, engagement of the edge of the hole 428 with the edge of the end portion 438 of the tongue 434 prevents the spring 422 from being decoupled or removed from the spring clip 420. Furthermore, the first and second side tabs 454, 456 and the central tab 452, located on opposite sides of the end region 416 of the spring 422, further retain the spring 422 from being disengaged with the end portion 438 of the tongue 434. For example, the first and second side tabs 454, 456 and/or the central tab 452 may limit movement of the spring 422 relative to the spring clip 420 in one or more directions or axes. In order to release or decouple the spring 422 from the spring clip 420, the tongue 434 may be deflected away from the spring 422 such that the end portion 438 of the tongue 434 is removed from the hole 428 and thus no longer is located in the hole 428 of the spring 422. When the end portion 438 of the tongue 434 is not located in the hole 428, the spring 422 may be lifted upward and away from the spring clip 420 to remove the spring 422 from the spring clip 420.

Further shown in FIG. 26, when the spring 422 is detachably coupled to the spring clip 420, the second end 424 of the spring 422 is positioned in the channel 459 defined between the first and second side tabs 454, 456 and the central tab 452. Thus, the first and second side tabs 454, 456 are located on the first side 496 of the spring 422 and the central tab 452 is located on the second side 498 of the spring 422. As shown in FIG. 26, the first side 496 of the spring 422 may be in contact with and/or parallel to a surface, such as a planar surface, of the first and/or second side tabs 454, 456 of the spring clip 420. Furthermore, the end portion 438 of the tongue 434 is shown extending through the hole 428 of the spring 422 from the second side 498 of the end region 416 of the spring 422 to the first side 496 of the end region 416 of the spring 422. As can be seen from FIG. 26, as the spring 422 is unwound (e.g., extended upward), the longitudinal portion 460 (e.g., elongated portion) of the spring 422 extends along the first surface 474 of the spring clip 420, including the surface of the tongue 434.

In some embodiments, the interaction between the spring 422 and the spring clip 420 may be considered a snap-fit or interlocking fit. By configuring the spring 422 and spring clip 420 such that the spring 422 may be readily detached from the spring clip 420, the spring 422 may be replaced as desired without tools and/or the removal of a rivet, screw, bolt, weld, solder or other fastening means.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A brush holder assembly of an electrical device, the brush holder assembly comprising:

a brush holder mountable to a stationary member, the brush holder configured for guiding a brush into contact with a moving surface;

a spring clip coupled to the brush holder, the spring clip including a main body portion having a first side, a second side opposite the first side, and a tongue extending from the main body portion; and a spring detachably coupled to the spring clip, the spring configured to press against a brush to urge the brush into sliding contact with the moving surface, the spring including a first side, a second side and an end region including a hole extending through the spring from the first side to the second side;

wherein the second side of the spring faces the first side of the main body portion of the spring clip and the tongue extends into the hole of the spring.

2. The brush holder assembly of claim 1, wherein the tongue is located in an opening bound by a first side portion of the spring clip and a second side portion of the spring clip.

3. The brush holder assembly of claim 2, wherein the end portion of the spring is positioned in the opening of the spring clip between the first side portion and the second side portion of the spring clip.

4. The brush holder assembly of claim 3, wherein the first and second side portions of the spring clip at least partially define side edges of the opening.

5. The brush holder assembly of claim 1, wherein the tongue extends in a direction away from the second side of the spring clip.

6. The brush holder assembly of claim 1, wherein the tongue is a unitary portion of the spring clip.

7. The brush holder assembly of claim 1, wherein the spring is positioned entirely on the first side of the spring clip.

8. The brush holder assembly of claim 1, wherein the spring clip includes a plurality of tabs, wherein at least a first tab faces and is in contact with the first side of the end region of the spring and at least a second tab faces and is in contact with the second side of the end region of the spring.

9. The brush holder assembly of claim 1, wherein the tongue includes a base portion attached to the main body portion of the spring clip and an end portion extending into an opening of the spring clip.

10. A brush holder assembly of an electrical device, the brush holder assembly comprising:

a brush holder mountable to a stationary member, the brush holder configured for guiding a brush into contact with a moving surface;

a spring clip coupled to the brush holder; and a spring detachably coupled to the spring clip, the spring configured to press against a brush to urge the brush into sliding contact with the moving surface;

wherein the spring clip includes a tongue extending through a hole of the spring from a first side of the spring to a second side of the spring.

11. The brush holder assembly of claim 10, wherein the spring clip includes an opening bounded by a first side portion of the spring clip and a second side portion of the spring clip; and wherein an end portion of the spring is positioned in the opening of the spring clip between the first side portion and the second side portion of the spring clip.

12. The brush holder assembly of claim 11, wherein the tongue extends into the opening of the spring clip.

13. The brush holder assembly of claim 10, wherein the spring is positioned entirely on a first side of the spring clip.

14. The brush holder assembly of claim 10, wherein the spring clip includes a planar surface along which the spring extends, wherein the tongue projects across the planar surface.

15. The brush holder assembly of claim 10, wherein the spring clip includes a plurality of tabs, wherein at least a first tab faces and is in contact with the first side of the spring and at least a second tab faces and is in contact with the second side of the spring.

16. A brush holder assembly of an electrical device, the brush holder assembly comprising:

a brush holder mountable to a stationary member, the brush holder configured for guiding a brush into contact with a moving surface;

a spring clip coupled to the brush holder, the spring clip having a first side, a second side opposite the first side, an opening defined between a first side portion and second side portion, and a tongue extending into the opening; and a spring detachably coupled to the spring clip, the spring configured to press against a brush to urge the brush into sliding contact with the moving surface, the spring including an end region including a hole extending therethrough;

wherein the end region of the spring is positioned in the opening between the first side portion and the second side portion and the tongue extends into the hole of the spring.

* * * * *